(12) United States Patent
Kuroda et al.

(10) Patent No.: US 8,259,112 B2
(45) Date of Patent: Sep. 4, 2012

(54) IMAGE GENERATING APPARATUS, METHOD OF GENERATING IMAGE, PROGRAM, AND RECORDING MEDIUM

(75) Inventors: Yoichi Kuroda, Tokyo (JP); Nobutaka Nishioka, Kanagawa (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 884 days.

(21) Appl. No.: 12/190,083

(22) Filed: Aug. 12, 2008

(65) Prior Publication Data
US 2009/0058856 A1  Mar. 5, 2009

(30) Foreign Application Priority Data
Aug. 30, 2007  (JP) .................. 2007-224908

(51) Int. Cl.
*G06T 15/10* (2006.01)
*G06T 15/00* (2006.01)
(52) U.S. Cl. ........................ 345/427; 345/419
(58) Field of Classification Search .............. 345/611, 345/620, 634, 636, 637; 382/296, 295, 285; 463/33, 32
See application file for complete search history.

(56) References Cited

U.S. PATENT DOCUMENTS

| | | | |
|---|---|---|---|
| 6,377,277 B1 | 4/2002 | Yamamoto | |
| 7,058,207 B2* | 6/2006 | Iida et al. | 382/104 |
| 7,824,265 B2* | 11/2010 | Kobayashi | 463/33 |
| 2004/0219978 A1* | 11/2004 | Teramoto et al. | 463/32 |
| 2004/0219980 A1* | 11/2004 | Bassett et al. | 463/33 |
| 2006/0004282 A1 | 1/2006 | Oosawa | |
| 2006/0046803 A1 | 3/2006 | Suzuki et al. | |
| 2006/0170942 A1 | 8/2006 | Chiba | |
| 2006/0258449 A1 | 11/2006 | Yasui et al. | |
| 2007/0155492 A1* | 7/2007 | Goden et al. | 463/32 |
| 2007/0206003 A1 | 9/2007 | Yoshida et al. | |
| 2007/0270215 A1* | 11/2007 | Miyamoto et al. | 463/32 |
| 2008/0070684 A1* | 3/2008 | Haigh-Hutchinson | 463/32 |
| 2010/0087248 A1* | 4/2010 | Takahashi | 463/30 |

FOREIGN PATENT DOCUMENTS

| | | |
|---|---|---|
| JP | 9-50541 | 2/1997 |
| JP | 3141737 | 12/2000 |

OTHER PUBLICATIONS

English language Abstract of JP 9-50541, Feb. 18, 1997.

\* cited by examiner

*Primary Examiner* — Hau Nguyen
*Assistant Examiner* — Leon T Cain, II
(74) *Attorney, Agent, or Firm* — Greenblum & Bernstein, P.L.C.

(57) ABSTRACT

The object is to smoothly move the position of the viewing point of the virtual camera with existence of an object between the position of the viewing point of the virtual camera and the position of the subject avoided. A camera peripheral area that has a viewing point as its center and has the radius of R, a subject peripheral area that has a subject toward which a viewing axis of the virtual camera is aligned as its center and has the radius of r, and a camera-to-subject area formed by a circular truncated cone area therebetween are set as a camera collision in which an obstacle cannot exist. When an obstacle exists in the camera collision, the position of the viewing point is adjusted. The radius R and the radius r are adjusted each time the reference distance D is changed.

16 Claims, 8 Drawing Sheets

$$R = R_s \times \left(\frac{D}{D_s}\right)^\alpha \quad r = r_s \times \left(\frac{D}{D_s}\right)^\beta \quad \text{(Numeric Equation 1)}$$

※ $D_s$ IS REFERENCE VALUE FOR DISTANCE BETWEEN VIEWING POINT AND SUBJECT

※ $R_s$ and $r_s$ ARE RADIUSES R OF CAMERA PERIPHERAL AREA AT D = $D_s$ STANDARD VALUE OF RADIUS r OF SUBJECT PERIPHERAL AREA $$R = R_S \times \left(\frac{D}{D_S}\right)^{\alpha} \qquad r = r_S \times \left(\frac{D}{D_S}\right)^{\beta} \qquad \text{(Numeric Equation 1)}$$

※ $D_S$ IS REFERENCE VALUE FOR DISTANCE BETWEEN VIEWING POINT AND SUBJECT

※ $R_S$ and $r_S$ ARE RADIUSES R OF CAMERA PERIPHERAL AREA AT $D = D_S$ STANDARD VALUE OF RADIUS r OF SUBJECT PERIPHERAL AREA

IMAGE GENERATING APPARATUS, METHOD OF GENERATING IMAGE, PROGRAM, AND RECORDING MEDIUM

CROSS REFERENCE TO RELATED APPLICATION

The present disclosure relates to subject matter contained in Japanese Patent Application No. 2007-224908, filed on Aug. 30, 2007, the disclosure of which is expressly incorporated herein by reference in its entirety.

BACKGROUND OF THE INVENTION

1. Field of the Invention

The present invention relates to an image generating apparatus that generates an image by performing a perspective transformation process and the like, and more particularly, to movement of a viewing point of a virtual camera for avoiding an obstacle.

2. Description of the Related Art

Among three-dimensional video games, there are video games in which an image acquired from perspective transforming a player character, which is moved in a virtual three-dimensional space by an operation of a player, as a subject is displayed on a game screen. Here, when an object (hereinafter, abbreviated as an obstacle) such as a land form or a building that becomes an obstacle is located between the position of a viewing point of a virtual camera and the position of a player character that becomes a subject, the player cannot visually recognize the player character on the game screen, and accordingly, there may be a trouble in progressing the game.

In order not to cause any trouble in progressing the game even in the above-described case where an obstacle is located between the position of the viewing point of the virtual camera and the position of the player character that becomes a subject, a technique of not displaying the obstacle or displaying the obstacle as a wire frame has been considered. In addition, in order to display the player character that becomes a subject on the game screen without disturbing the atmosphere of the game, a technique of performing a perspective transformation process for the obstacle has been considered (for example, see Japanese Patent No. 3141737 (paragraphs 0007, 0061, 0071, and the like)).

However, according to the technique disclosed in Japanese Patent No. 3141737, when an obstacle exists between the position of the viewing point of the virtual camera and the subject, an object that is located on the rear side of the obstacle and should not be seen is perspective displayed. In such a case, the player can visually recognize the subject all the time, and accordingly, it is convenient to progress the game. However, a subject that should not be seen is visually recognized by the player, and thus a feeling of strangeness may be acquired from the game screen.

On the other hand, in most of general three-dimensional video games, in a case where an obstacle is located between the position of the viewing point of the virtual camera and the position of the subject, a technique of moving the viewing point of the virtual camera to such a position that the obstacle is not located between the position of the subject and the position of the viewing point of the virtual camera has been employed. In addition, as a destination of the position of the viewing point of the virtual camera for avoiding an obstacle, a position located on the upper side of polar coordinates or a position closet to the subject than the obstacle is generally used.

However, in the virtual three-dimensional space that is used in a game, there are many objects such as walls that have heights larger than the player character. Thus, according to the technique of moving the position of the viewing point of the virtual camera to a position located on the upper side of polar coordinates, there is a problem that a view angle for the subject is considerably changed. In addition, according to the technique of moving the position of the viewing point of the virtual camera to a position closer to the subject than the object, particularly when the obstacle is located near the subject, there is a problem that the amount of movement of the position of the viewing point of the virtual camera becomes too large.

In addition, when any one of the above-described techniques is used as a technique of moving the position of the viewing point of the virtual camera for avoiding an obstacle, a state in which an obstacle abruptly exists between the position of the viewing point of the virtual camera and the position of the subject occurs from a state in which the obstacle does not exist therebetween. Accordingly, the position of the viewing point of the virtual camera is moved to a completely different position instantly. In a real world, in a case where one cameraman performs a photograph operation, the instant movement of the camera described above cannot happen, and accordingly, there is a possibility that the player acquires a feeling of strangeness from the game screen.

In addition, even in a case where the position of the viewing point of the virtual camera is moved to a position for avoiding an obstacle for a predetermined time period, there are many cases that the position of the viewing point of the virtual camera is abruptly moved, and accordingly, so-called camera sickness (camera sickness) may occur to the player. In a real world, particularly when the obstacle is located close to the cameraman, a case where the cameraman does not recognize existence of the obstacle until the obstacle is located between the camera and the subject scarcely occurs. In addition, when there is a possibility that the obstacle is located between the camera and the subject, generally, the cameraman is supposed to move for avoiding the obstacle in advance.

SUMMARY OF THE INVENTION

The object of the present invention is to provide an image generating apparatus capable of smoothly moving the position of the viewing point of the virtual camera with existence of an obstacle between the position of the viewing position of the virtual camera and the position of the subject avoided and the like.

In order to accomplish the above-described object, according to a first aspect of the present invention, there is provided an image generating apparatus that generates an image by perspective transforming a specific subject existing in a virtual three-dimensional space with a viewing axis of a virtual camera aligned toward the specific subject. The image generating apparatus includes: a subject control unit that moves a position of the specific subject in the virtual three-dimensional space; a virtual camera control unit that moves a position of the viewing point of the virtual camera in the virtual three-dimensional space in accordance with movement of the position of the specific subject while aligning the viewing axis of the virtual camera toward the specific subject; a perspective transformation unit that generates a two-dimensional image displayed in a display device by perspective transforming the virtual three-dimensional space including the specific subject on a virtual screen in accordance with the virtual camera that is controlled by the virtual camera control unit; an obstacle avoiding area setting unit that sets a camera peripheral area that is set around the viewing point of the virtual camera and an area that is continuously connected from the camera peripheral area to at least a position around the specific subject as an obstacle avoiding area, with reference to at least the position of the viewing point of the virtual camera; and an obstacle determining unit that determines whether an obstacle exists in the obstacle avoiding area set by the obstacle avoiding area setting unit. The virtual camera control unit includes an obstacle avoiding control section that moves the position of the viewing point of the virtual camera to a position for which the obstacle is not located in the obstacle avoiding area in a case where it is determined that the obstacle exists in the obstacle avoiding area by the obstacle determining unit, and the obstacle avoiding area setting unit includes an obstacle avoiding area changing section that changes the size of the obstacle avoiding area in accordance with a distance between the position of the viewing point of the virtual camera in the virtual three-dimensional space and the position of the specific subject.

In the above-described image generating apparatus, the obstacle avoiding area setting unit may be configured to set the camera peripheral area, a subject peripheral area that is set around the position of the specific subject with reference to the position of the specific subject, and a camera-to-subject area that is an area between the camera peripheral area and the subject peripheral area, as the obstacle avoiding area.

In addition, the obstacle avoiding area setting unit may be configured to set the camera peripheral area and a camera-to-subject area that is an area between the camera peripheral area and the specific subject as the obstacle avoiding area.

In the above-described image generating apparatus, the obstacle avoiding area setting unit may be configured to set at least an area included in a sphere, which has the position of the viewing point of the virtual camera as its center, as the obstacle avoiding area as the camera peripheral area, and the obstacle avoiding area setting unit may be configured to change the radius of the sphere that is set as the camera peripheral area in accordance with the distance between the position of the viewing point of the virtual camera in the virtual three-dimensional space and the position of the specific subject.

In the above-described image generating apparatus, the virtual camera control unit may be configured to move the position of the viewing point of the virtual camera while maintaining a position in the height direction in the virtual three-dimensional space. In such a case, the obstacle avoiding area setting unit may be configured to set the obstacle avoiding area within a plane formed by a straight line that connects the viewing point of the virtual camera and the specific subject and other straight lines that are perpendicular to the straight line and parallel to the height direction in the virtual three-dimensional space which is perpendicular to the straight line.

In the above-described image generating apparatus, the virtual three-dimensional space may be a game space of a video game. In other words, the above-described image generating apparatus may be configured to generate images of a video game. In such a case, the obstacle avoiding area changing section may be configured to additionally change the size of the obstacle avoiding area in accordance with the progress status of the video game.

For example, the obstacle avoiding area changing section may be configured to change the size of the obstacle avoiding area to decrease as the number of objects in a scene which can be obstacles increases.

In order to accomplish the above-described object, according to a second aspect of the present invention, there is provided an image generating method that is used for generating an image by perspective transforming a specific subject existing in a virtual three-dimensional space with a viewing axis of a virtual camera aligned toward the specific subject. The image generating method includes: moving the position of the specific subject in the virtual three-dimensional space and storing the position of the specific subject in a storage device; moving the position of the viewing point of the virtual camera in the virtual three-dimensional space in accordance with movement of the position of the specific subject while aligning the viewing axis of the virtual camera toward the specific subject and storing information on the positions of the viewing axis and the viewing point of the virtual camera in the storage device; setting a camera peripheral area that is set around the viewing point of the virtual camera and an area that is continuously connected from the camera peripheral area to at least a position around the specific subject as an obstacle avoiding area of which size changes in accordance with a distance between the position of the viewing point of the virtual camera in the virtual three-dimensional space and the position of the specific subject, with reference to at least the position of the viewing point of the virtual camera and storing information on the obstacle avoiding area in the storage device; determining whether an obstacle exists in the obstacle avoiding area, information on which is stored in the storage device based on the information on the position of the obstacle stored in the storage device; moving the position of the viewing point of the virtual camera to a position for which the obstacle is not located in the obstacle avoiding area again in a case where it is determined that the obstacle exists in the obstacle avoiding area and storing information on the positions of the viewing axis and the viewing point of the virtual camera after the movement in the storage device; and generating a two-dimensional image to be displayed in a display device by perspective transforming the virtual three-dimensional space including the specific subject on a virtual screen based on the information on the positions of the viewing axis and the viewing point of the virtual camera, information on which is stored in the storage device and storing the two-dimensional image in the storage device.

In order to accomplish the above-described object, according to a third aspect of the present invention, there is provided a program that allows a computer apparatus to perform a process for generating an image by perspective transforming a specific subject existing in a virtual three-dimensional space with a viewing axis of a virtual camera aligned toward the specific subject. The program allows the computer apparatus to perform: moving the position of the specific subject in the virtual three-dimensional space and storing the position of the specific subject in a storage device included in the computer apparatus; moving the position of the viewing point of the virtual camera in the virtual three-dimensional space in accordance with movement of the position of the specific subject while aligning the viewing axis of the virtual camera toward the specific subject and storing information on the positions of the viewing axis and the viewing point of the virtual camera in the storage device; setting a camera peripheral area that is set around the viewing point of the virtual camera and an area that is continuously connected from the camera peripheral area to at least a position around the specific subject as an obstacle avoiding area of which size changes in accordance with a distance between the position of the viewing point of the virtual camera in the virtual three-dimensional space and the position of the specific subject, with reference to at least the position of the viewing point of the virtual camera and storing information on the obstacle avoiding area in the storage device; determining whether an obstacle exists in the obstacle avoiding area, information on which is stored in the storage device based on the information on the position of the obstacle stored in the storage device; moving the position of the viewing point of the virtual camera to a position for which the obstacle is not located in the obstacle avoiding area again in a case where it is determined that the obstacle exists in the obstacle avoiding area and storing information on the positions of the viewing axis and the viewing point of the virtual camera after the movement in the storage device; and generating a two-dimensional image to be displayed in a display device by perspective transforming the virtual three-dimensional space including the specific subject on a virtual screen based on the information on the positions of the viewing axis and the viewing point of the virtual camera, information on which is stored in the storage device and storing the two-dimensional image in the storage device.

The program according to the third aspect may be recorded on a computer-readable recording medium. The computer-readable recording medium may be configured to be detachably attached to the computer apparatus and provided separately from the computer apparatus. In addition, the computer-readable recording medium may be disposed inside the computer apparatus and may be a recording medium such as a fixed disk device that is provided together with the computer apparatus. The program according to the third aspect may be delivered from a server apparatus existing on a network to the computer apparatus through the network by superposing a data signal into a carrier wave.

DESCRIPTION OF THE PREFERRED EMBODIMENTS

Figure 1:
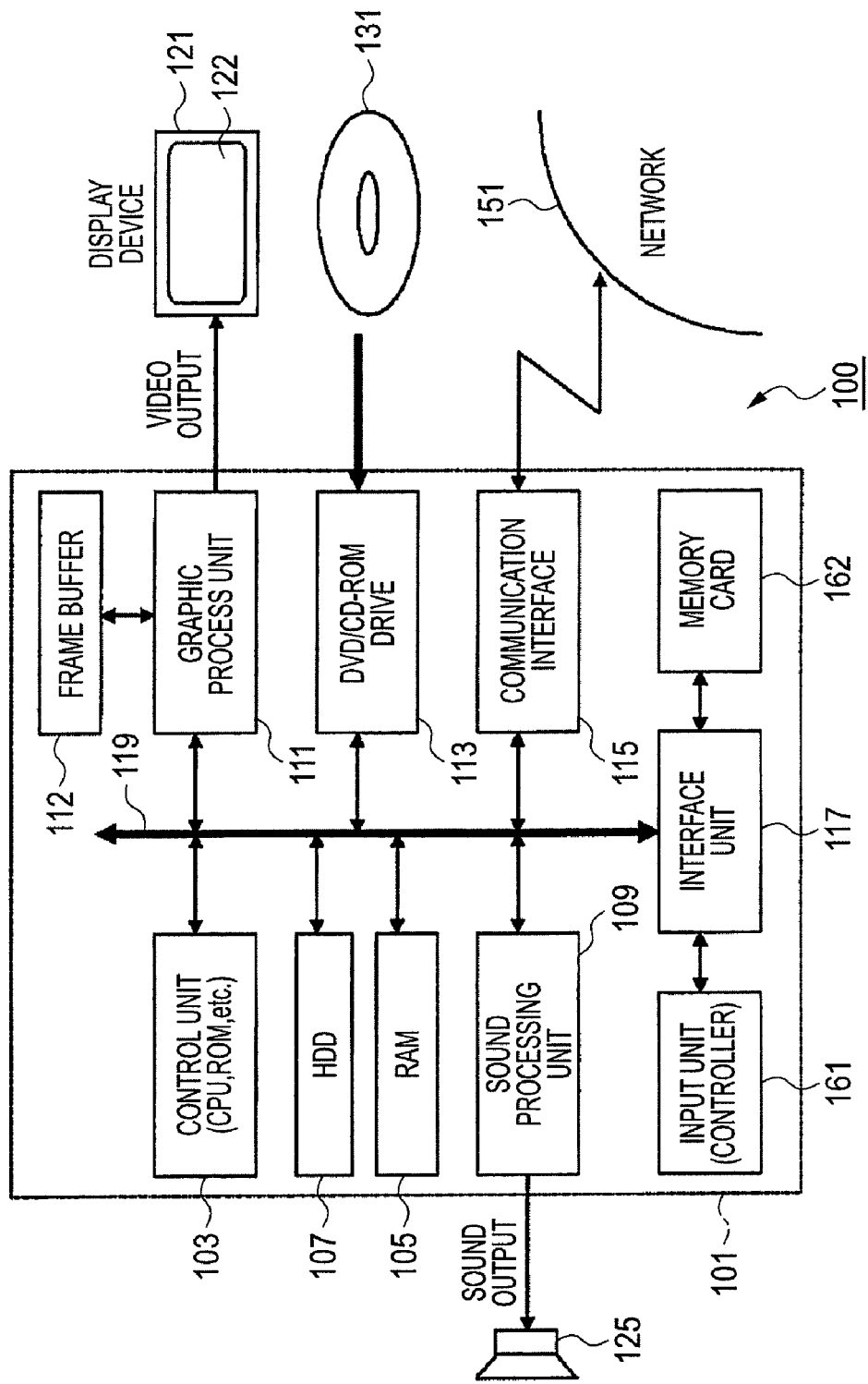
FIG. 1 is a block diagram showing the configuration of a video game device according to an embodiment of the present invention.

The above-described first aspect of the present invention provides an image generating apparatus in which the position of the specific subject is moved in the virtual three-dimensional space, and a two-dimensional image to be displayed on a display device is generated by perspective transforming the virtual three-dimensional space including the specific subject on a virtual screen by using the virtual camera. Here, the position of the viewing point of the virtual camera is basically moved in accordance with movement of the specific subject. However, when an obstacle exists in the obstacle avoiding area, which is acquired based on the position of the viewing point determined in accordance with the position of the subject, including the camera peripheral area that is set around the position of the viewing point based on the position of the viewing point of the virtual camera and an area that is continued from the camera peripheral area to the vicinity of the specific subject, the position of the viewing point of the virtual camera is moved to a position for which an obstacle is not located within the obstacle avoiding area.

Here, the size of the obstacle avoiding area is configured to be changed in accordance with the distance between the position of the viewing point of the virtual camera and the position of the specific subject. For example, when the distance between the position of the viewing point of the virtual camera and the specific subject is shortened, the size of the obstacle avoiding area is decreased. Accordingly, in a case where an obstacle exists in a position of the obstacle avoiding area which is relatively far from the position of the viewing point of the virtual camera, when the position of the viewing point of the virtual camera is moved close to the position of the specific subject, the size of the obstacle avoiding area is decreased. Accordingly, the position of the viewing point of the virtual camera can be determined to be a position for which an obstacle is not located within the obstacle avoiding area.

Accordingly, for example, in a case where a distance between a straight line connecting the position of the viewing point of the virtual camera and the position of the subject together and the obstacle slowly decreases, the position of the viewing point of the virtual camera can be slowly moved closer to the position of the subject with facing toward the position of the subject. When an obstacle is located in the middle of the straight line, the position of the viewing point of the virtual camera has been considerably moved to the subject side right before the obstacle is located in the middle of the straight line. Accordingly, even when the viewing point of the virtual camera is moved to a position having a shorter distance from the subject than the obstacle, the position of the viewing point of the virtual camera is not moved abruptly.

As described above, even when the position of the viewing point of the virtual camera is controlled such that locating an obstacle between the position of the viewing point of the virtual camera and the position of the specific subject is avoided, the position of the viewing point of the virtual camera is configured to be smoothly moved. Accordingly, a case that a person watching the image displayed in the display device acquires a feeling of strangeness or camera sickness can be prevented. In addition, the perspective transformation process is not performed for the obstacle, and an object that should not be visible in the image displayed in the display device is not visually recognized. Accordingly, a person watching the displayed image does not acquire a feeling of strangeness.

In addition, it is preferable that the obstacle avoiding control unit moves the position of the viewing point of the virtual camera on the line that connects the position of the viewing point of the virtual camera and the specific subject for avoiding locating the obstacle in the obstacle avoiding area. However, depending on situations, the obstacle avoiding control unit may be configured to move the position of the viewing point of the virtual camera to a position that is not located on the line. In addition, when the position of the viewing point of the virtual camera is moved on the line that connects the position of the viewing point of the virtual camera and the specific subject, the area of the field of view of the virtual camera may be configured to be changed in accordance with the distance between the position of the viewing point of the virtual camera and the position of the specific subject.

The above-described image generating apparatus may be configured to further include an obstacle moving unit that moves the position of the obstacle in the virtual three-dimensional space. In such a case, the obstacle determining unit may be configured to determine whether an obstacle exists in the obstacle avoiding area set by the obstacle avoiding area setting unit in accordance with not only the movement of the position of the specific subject and the position of the viewing point of the virtual camera but also the movement of the position of the obstacle.

In addition, in the above-described image generating apparatus, the virtual camera control unit may be configured to move the position of the viewing point of the virtual camera, for example, in accordance with predetermined input from a user by using an input device, in addition to the movement of the position of the specific subject.

In the image generating apparatus in which the subject peripheral area is set around the position of the specific subject, even when an obstacle slowly moves closer to the position of the subject from a position located very close to the position of the subject, locating an obstacle between the position of the viewing point of the virtual camera and the position of the subject can be avoided with the position of the viewing point of the virtual camera moved smoothly. On the other hand, in the latter case, the camera-to-subject area can be formed to have a cone shape. Accordingly, it can be determined whether an obstacle exists in the obstacle avoiding area with processing load less than that in the former case, when the subject peripheral area and the camera-to-subject area are set as the obstacle avoiding area in addition to the camera peripheral area, the obstacle avoiding area setting unit may be configured to set the area included in a sphere having the position of the specific subject as its center as the obstacle avoiding area as the subject peripheral area. In such a case, the obstacle avoiding area setting unit may be configured to change the radius of the sphere that is set as the subject peripheral area in accordance with the distance in the virtual three-dimensional space between the position of the viewing point of the virtual camera and the position of the specific subject.

As described above, the camera peripheral area and the subject peripheral area are set as areas included in the sphere having the position of the viewing point of the virtual camera as its center and the sphere having the position of the specific subject as its center. Accordingly, whether an obstacle exists in the camera peripheral area or the subject peripheral area can be easily determined by calculating a distance between the position of the viewing point of the virtual camera or the position of the specific subject and the position of the obstacle. In addition, when the sizes of the camera peripheral area and the subject peripheral area are configured to be changed in accordance with the distance between the position of the viewing point of the virtual camera and the position of the specific subject, the calculation process does not become complex.

In addition, when both the camera peripheral area and the subject peripheral area are set as areas having a sphere shape, an area having a circular truncated cone shape included between the camera peripheral area and the subject peripheral area may be set as the obstacle avoiding area as the camera-to-subject area. First of all, even when both the camera peripheral area and the subject peripheral area are set as areas having a sphere shape, an area having a frustum of pyramid shape (close to the circular truncated cone shape) included between the camera peripheral area and the subject peripheral area may be set as the obstacle avoiding area as the camera-to-subject area.

On the other hand, when the camera-to-subject area is set as the obstacle avoiding area in addition to the camera peripheral area without setting the subject peripheral area as the obstacle avoiding area and the camera peripheral area is set as an area having a sphere shape, an area having a cone shape included between the camera peripheral area and the subject peripheral area may be set as the obstacle avoiding area as the camera-to-subject area. First of all, even when the camera peripheral area is set as an area having a sphere shape, an area having a frustum of pyramid shape (close to the cone shape) included between the camera peripheral area and the subject peripheral area may be set as the obstacle avoiding area as the camera-to-subject area.

When the camera peripheral area and the subject peripheral area are areas of a sphere shape, the shape of the camera-to-subject area basically becomes a circular truncated cone shape or a cone shape. First of all, whether an obstacle exists in the area having the circular truncated cone shape or the area having the cone shape cannot be determined with a simple calculation process as is needed for determining whether an obstacle exists in an area having a sphere shape. Thus, by setting the camera-to-subject area to have a frustum of pyramid shape or a pyramid shape, the processing load for determining whether an obstacle exists in the camera-to-subject area can be reduced.

In addition, the camera peripheral area may be set as an area of a polyhedron having the position of the viewing point of the virtual camera as its (approximate) center. In addition, when the subject peripheral area is also set as the obstacle avoiding area, the subject peripheral area may be set as an area of a polyhedron having the position of the specific subject as its (approximate) center. It is preferable that the number of faces of the polyhedron or the number of vertexes of the bottom face of the frustum of pyramid or the pyramid that forms the camera-to-subject area is increased, in view of smoothly moving the position of the virtual camera. However, in view of the process amount, it is preferable that the number of the faces of the polyhedron or the number of the vertexes of the bottom face of the frustum of pyramid or the pyramid is decreased. Accordingly, the number of the faces of the polyhedron or the number of the vertexes of the bottom face of the frustum of pyramid or the pyramid is appropriately selected based on the process capability of the computer apparatus to which the image generating apparatus according to an embodiment of the present invention is applied.

In the above-described image generating apparatus, a predetermined distance limit may be determined for the distance between the position of the viewing point of the virtual camera and the position of the subject. Here, in a case where the camera peripheral area is set as a sphere-shaped area, when the distance between the position of the viewing point of the virtual camera and the position of the subject is the distance limit, the radius of the sphere forming the virtual camera peripheral area may be set to zero.

In the image generating apparatus in which the height direction of the viewing point of the virtual camera is maintained, although there is a condition that the position in the height direction is maintained in the virtual three-dimensional space in moving the position of the viewing point of the virtual camera, the obstacle avoiding area can be set within a plane under the condition. Since whether an obstacle exists within a plane area can be determined by performing two-dimension calculation, determination whether an obstacle exists in the obstacle avoiding area can be performed with a more simple calculation process.

In the image generating apparatus in which the size of the obstacle avoiding area is changed in accordance with the progress status of the game, smooth movement of the position of the viewing point of the virtual camera or relatively abrupt movement of the position of the viewing point can be selectively used based on a game scene, and accordingly, a realistic image according to the progress status of the game can be generated as an image of the video game. In addition, by decreasing the size of the obstacle avoiding area in a scene having many objects that can be obstacles, a control operation for moving the position of the viewing point of the virtual camera so as to avoid locating an obstacle in the obstacle avoiding area of the scene is not performed more than is needed.

In addition, it maybe configured that a reference value for the distance between the position of the viewing point of the virtual camera and the position of the subject is provided and the size of the obstacle avoiding area for a case where the distance between the position of the viewing point of the virtual camera and the position of the subject is the reference value is set as a standard value in advance. In such a case, the obstacle avoiding area changing section may be configured to change the standard value for the obstacle avoiding area in accordance with the progress status of the video game.

Hereinafter, embodiments of the present invention will be described with reference to the accompanying drawings. Here, a case where the present invention is applied to an operation for generating an image in a video game will be described as an example.

FIG. 1 is a block diagram showing the configuration of a video game device according to this embodiment. As shown in the figure, the video game device 100 is constituted by a main body 101 as its primary element. The main body 101 includes a control unit 103 that is connected to an internal bus 119, a RAM (Random Access Memory) 105, a hard disk drive (HDD) 107, a sound processing unit 109, a graphic process unit 111, a DVD/CD-ROM drive 113, a communication interface 115, and an interface unit 117.

The sound processing unit 109 of the main body 101 is connected to a sound output device 125 that is a speaker, and the graphic process unit 111 is connected to a display device 121 having a display screen 122. Into the DVD/CD-ROM drive 113, a recording medium (in this embodiment, a DVD-ROM or a CD-ROM) 131 can be loaded. The communication interface 115 is connected to a network 151. To the interface unit 117, an input unit (a controller) 161 and a memory card 162 are connected.

The control unit 103 includes a CPU (Central Processing Unit), a ROM (Read Only Memory), and the like. The control unit executes a program stored in the HDD 107 or the recording medium 131 and controls the main body 101. In addition, the control unit 103 includes an internal timer. The RAM 105 is a work area of the control unit 103. Information on the position of a player character, the position of a viewing point of a virtual camera, the direction of a viewing axis, the size of camera collision, coordinates of vertexes of each polygon that is perspective transformed, and the like, to be described later, is temporarily stored in the RAM 105. The HDD 107 is a storage area for storing a program or data. When a program executed by the control unit 103 directs to output sound, the sound processing unit 109 interprets the direction and outputs a sound signal to the sound output device 125.

The graphic process unit 111 expands image data into a frame memory 112 (in the figure, although the frame memory is drawn outside the graphic process unit 111, it is provided inside a RAM included in a chip constituting the graphic process unit 111) in accordance with a drawing command output from the control unit 103 and outputs a video signal for displaying an image on a display screen 122 of the display device 121. A time period of one frame of an image included in a video signal output from the graphic process unit 111 is, for example, 1/60 second. Two sets of frame memories 112 are provided, and uses of the frame memories are switched between data recording and data reading for each frame period.

The graphic process unit 111 generates image data of a two-dimensional image acquired from performing a perspective transformation process for objects (a player character, a non-player character, and objects other than characters) existing in a virtual three-dimensional space by using a virtual camera and records the image data in the frame memories 112. The direction of the viewing axis of the virtual camera is configured to be aligned forward the player character (more particularly, a reference point set in an almost center position of the player character) all the time. In other words, the player character is a subject for a perspective transformation process all the time.

The DVD/CD-ROM drive 113 reads out a program and data from the recording medium 131. The communication interface 115 is connected to the network 151, and communicates with other computers. The input unit 161 includes arrow keys and a plurality of operation buttons. The position of the player character in the virtual three-dimensional space is moved in accordance with a direction input by using the arrow keys of the input unit 161.

In addition, as the operation buttons of the input unit 161, four buttons of L1, R1, L2, and R2 (hereinafter, these buttons may be referred to as LR buttons as a whole) are provided, in addition to buttons for designating operations of the player character and the like. The position of the viewing point of the virtual camera is moved in accordance with the player character based on the direction input by using the arrow keys. In addition, the position of the viewing point of the virtual camera is turned to the left side or the right side of the position of the player character in accordance with a direction input by using the button L1 or R1. In addition, the position of the viewing point of the virtual camera is moved to the upside or the downside in polar coordinates by using the position of the player character as the original point in accordance with a direction input by using the button L2 or R2.

First of all, movement of the position of the viewing point of the virtual camera is controlled such that an obstacle in not placed inside camera collision in a case where the obstacle (in this embodiment an object other than a player character and a non-player character can be an obstacle) exists in the camera collision to be described later. The camera collision and avoidance of an obstacle will be described later in detail.

The interface unit 117 outputs input data from the input unit 161 to the RAM 105, and the control unit 103 interprets the input data so as to perform a calculation process. In addition, the interface unit 117 stores data representing a progress status of a game, which is stored in the RAM 105, in the memory card 162, based on the direction from the control unit 103. In addition, the interface unit 117 reads out game data at a time when the game is stopped which is stored in the memory card 162 and transmits the game data to the RAM 105.

Programs and data used for performing a game by using the video game device 100 are, at first, stored, for example, in the recording medium 131. The data stored in the recording medium 131 includes graphic data for configuring objects existing in the game space (the virtual three-dimensional space). The programs and data stored in the recording medium 131 are read out by the DVD/CD-ROM drive 113 in a game executing process and are then loaded into the RAM 105. The control unit 103 processes the programs and data loaded into the RAM 105, outputs a drawing command to the graphic process unit 111, and outputs a direction for outputting a sound to the sound processing unit 109. Intermediate data during a process of the control unit 103 is stored in the RAM 105.

In a video game according to this embodiment, a plurality of three-dimensional objects exists in the virtual three-dimensional space that becomes a game space, and an image acquired from performing perspective transformation for the objects by using a virtual camera is displayed on the display screen 122 of the display device 121 as an image of the game. In the objects that exist in the virtual three-dimensional space, a player character that is moved in accordance with a player's input by using the input unit 161, a non-player character (that is operated by the control unit 103) that is a character other than the player character, and objects such as a land form and a building other than a character of which position in the virtual three-dimensional space is not changed are included.

A player character is configured as a subject that the position of the viewing axis of the virtual camera is configured to face all the time in the perspective transformation process. A non-player character is an object that does not become an obstacle for the perspective transformation process. Accordingly, even when the non-player character exists within the range of camera collision to be described later, the position of the viewing point of the virtual camera is not changed. An object other than characters is an object that becomes an obstacle. Accordingly, when the object (obstacle) other than the characters exists within the range of camera collision to be described later, the position of the viewing point of the virtual camera is moved to a position in which an obstacle does not exist in the camera collision.

Figure 2:
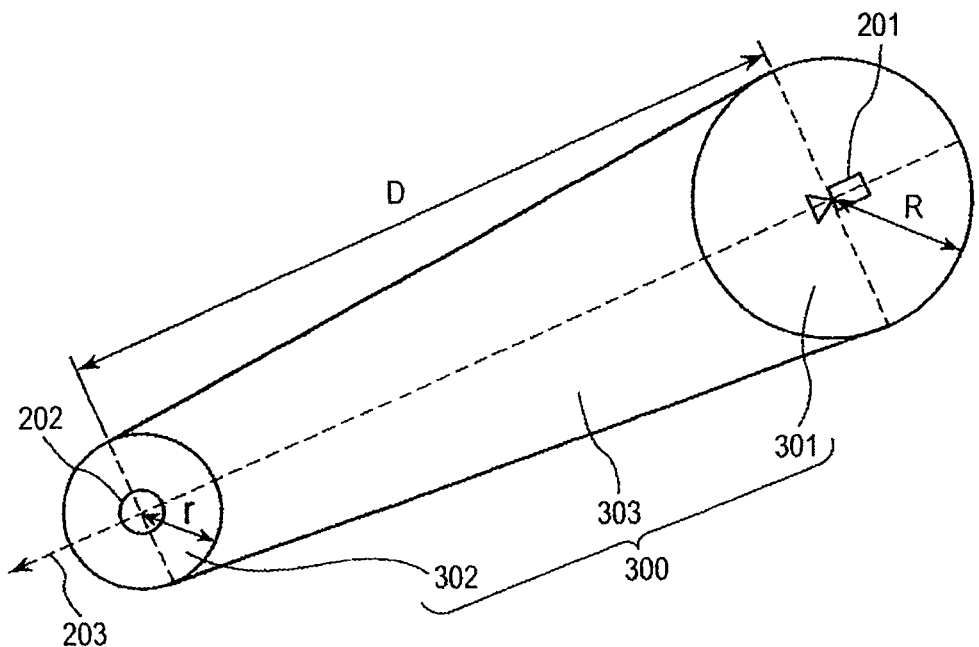
FIG. 2 is a diagram showing an example of camera collision set in a video game according to an embodiment of the present invention.

Next, camera collision that is set for controlling the position of the viewing point of the virtual camera for avoiding an obstacle in the video game according to this embodiment will be described. FIG. 2 is a diagram showing an example of the camera collision set in the video game according to this embodiment. As shown in the figure, the camera collision 300 is configured by a camera peripheral area 301 that is set as a sphere having a viewing point 201 of the virtual camera as its center and having a radius of R, a subject peripheral area 302 that is set as a sphere having a subject (player character) 202 as its center and having a radius of r, and a camera-to-subject area 303 that is set as an area having a circular truncated cone shape which is positioned between the camera peripheral area 301 and the subject peripheral area 302.

The radius R of the camera peripheral area 301 and the radius r of the subject peripheral area 302 change in accordance with a distance D between the position of the viewing point 201 of the virtual camera and the position of the subject 202. In other words, when it is assumed that standard values of the radiuses R and r are Rs and rs in a case where the distance D between the viewing point 201 of the virtual camera 201 and the position of the subject 202 is a distance (reference distance) $D_s$ that is a predetermined reference value, the radius R of the camera peripheral area 301 and the radius r of the subject peripheral area 302 are calculated by using equations shown in Numeric Equation 1.

$$R = R_s \times (D/D_s)\alpha \qquad \text{Numeric Equation 1}$$

$$r = r_s \times (D/D_s)\beta$$

where, $\alpha$ and $\beta$ are predetermined constants, and it may be configured that $\alpha = \beta$.

As can be known from Numeric Equation 1, the radius R of the camera peripheral area 301 and the radius r of the subject peripheral area 302 which determine the size of the camera collision 300 become smaller than the standard values $R_s$, $r_s$, when the distance D between the position of the viewing point 201 of the virtual camera and the position of the subject 202 becomes smaller than the reference distance $D_s$. Commonly, the position of the viewing point 201 of the virtual camera is set to a position in which the distance D between the subject 202 and the viewing point of the virtual camera becomes the reference distance $D_s$. However, when an obstacle exists in the camera collision 300, the position of the viewing point 201 of the virtual camera is set to a position closer to the position of the subject 202.

When an obstacle does not exist in the camera collision 300, the position of the viewing point 201 of the virtual camera 201 is moved with the distance from the subject 202 maintained at the reference distance $D_s$ in accordance with movement of a player character that becomes the subject 202 or input of the LR buttons. In other words, in a case where an obstacle does not exist in the camera collision 300, when the player character (the subject 202) moves, the position of the viewing point 201 of the virtual camera is moved by a same distance as that of movement of the player character in parallel with the player character without changing the direction of the viewing axis 203. In addition, when a direction is input from the LR buttons, the position of the viewing point of the virtual camera is rotated about the subject 202 by a predetermined angle with the distance from the player character that becomes the subject 202 maintained at a distance $D_s$. In accompaniment with the rotation of the position of the viewing point of the virtual camera, the direction of the viewing axis 203 of the virtual camera is changed.

In a position (next candidate position) to which the viewing point 201 of the virtual camera is moved from a state that the distance D between the position of the viewing point 201 of the virtual camera and the position of the subject 202 is the reference distance $D_s$, in accordance with the movement of the subject 202 or the input by using the LR buttons, when an obstacle exists within the range of the camera collision 300, the position of the viewing point 201 of the virtual camera is moved by a predetermined distance to be closer to the subject 202 than the next candidate position (there is no change in the direction of the viewing axis 203).

When the position of the viewing point 201 of the virtual camera is moved toward the subject 202, that is, when the distance D decreases, the radius R of the camera peripheral area 301 and the radius r of the subject peripheral area 302 decrease, and accordingly, the size of the camera collision 300 decreases. In such a case, when an obstacle does not exist in the decreased camera collision 300, the position of the viewing point 201 of the virtual camera is determined. However, when an obstacle exists in the decreased camera collision 300, the position of the viewing point 201 of the virtual camera is moved to a position, in which an obstacle does not exist within the camera collision 300, closer to the subject 202 side (no change in the direction of the viewing axis 203).

On the other hand, in a position (next candidate position) to which the viewing point 201 of the virtual camera is moved from a state that the distance D between the position of the viewing point 201 of the virtual camera and the position of the subject 202 is shorter than the reference distance $D_s$, in accordance with the movement of the subject 202 or the input by using the LR buttons, when an obstacle does not exist within the range of the camera collision 300, the position of the viewing point 201 of the virtual camera is moved by a predetermined distance to be farther from the subject 202 than the next candidate position (there is no change in the direction of the viewing axis 203) under a condition that the distance D between the position of the viewing point 201 of the virtual camera and the position of the subject 202 is smaller than the reference distance $D_s$.

The position of the viewing point 201 of the virtual camera is moved far from the subject 202. In other words, when the distance D increases, the radius R of the camera peripheral area 301 and the radius r of the subject peripheral area 302 increase, and accordingly the size of the camera collision 300 increases. However, when an obstacle exists in the expanded camera collision 300, the position of the viewing point 201 of the virtual camera is moved by a predetermined distance toward the subject 202 and is restored back to the original next candidate position (there is no change in the direction of the viewing axis 203).

In addition, when the position of the viewing point 201 of the virtual camera is moved far from the subject 202 and an obstacle does not exist in the enlarged camera collision 300, the position of the virtual camera 201 is moved far from the subject 202 by a predetermined distance until the distance D becomes the reference distance $D_s$ or becomes a maximum distance under a state that an obstacle exists in the camera collision 300 (there is no change in the direction of the viewing axis 203).

As described above, the position of the viewing point 201 can be moved in a smooth manner without being rapidly changed due to existence of an obstacle by controlling movement of the viewing point 201 of the virtual camera such that an obstacle does not exist in the camera collision 300 changing in size in accordance with the distance D between the position of the viewing point 201 of the virtual camera and the subject 202. The relationship between setting of the camera collision 300 and the movement of the position of the viewing point 201 of the virtual camera will be described later in detail.

Whether an obstacle exists in the camera collision 300 is determined for each of the camera peripheral area 301, the subject peripheral area 302, and the camera-to-subject area 303. When an obstacle is determined to exist in any one of the camera peripheral area 301, the subject peripheral area 302, and the camera-to-subject area 303, it is determined that an obstacle exists in the camera collision 300.

Here, whether an obstacle exists in the camera peripheral area 301 can be determined based on whether the distance between the position of the viewing point 201 of the virtual camera and each object that can be an obstacle is equal to or small than the radius R. Similarly, whether an obstacle exists in the subject peripheral area 302 can be determined based on whether the distance between the position of the subject 202 and each object that can be an obstacle is equal to or smaller than the radius r.

For the camera-to-subject area 303, for example, whether an obstacle exists in a cone (becomes a part of a circular truncated cone constituting the camera-to-subject area 303) defined by the position of the viewing point 201 of the virtual camera 201, the position of the subject 202, and the radiuses R and r of the camera peripheral area 301 and the subject peripheral area 302 is determined based on calculation of an angle from the vertex of the cone. Then, whether existence of the obstacle is a part that is not included in the circular truncated cone constituting the camera subject area 303 is determined based on calculation of a distance from the vertex of the cone.

When the position of the viewing point 201 of the virtual camera and the direction of the viewing axis 203 are determined as described above, an image, in which objects included in a field of view that is set as a range of a predetermined angle on the basis of the viewing point 201 and the viewing axis 203 and a clipping range formed by a front clipping surface and a rear clipping surface are projected on a virtual screen by a perspective transformation process, is generated.

Described in more details, the control unit 103 transforms coordinates of vertexes of polygons constituting each object included in the clipping range on the basis of the position of the viewing point 201 of the virtual camera and the direction of the viewing axis 203 in the world coordinate system (a coordinate system of a virtual three-dimensional space) into coordinates in a viewpoint coordinate system by a perspective transformation process. In addition, the control unit 103 transforms the resultant coordinates into coordinates in a screen coordinate system (a coordinate system on a virtual screen). Then, the control unit outputs a drawing command to the graphic process unit ill together with information on the polygons of which coordinates have been transformed in the screen coordinate system.

The graphic process unit 111 that has received the drawing command records image data of an image acquired from projecting the objects included in the clipping range on the virtual screen in the frame memory 112 (that is used for recording in this frame period) in accordance with the information on the polygons which has been received from the control unit 103 while performing a hidden face removing process. The graphic process unit 111 reads out the image data recorded in the frame memory 112 during the previous frame period and outputs the image data to the display device 121 as a video signal.

Hereinafter, the process of the video game according to this embodiment will be described. The video game according to this embodiment progresses as a player moves a player character in a virtual three dimensional space that becomes a game space by operating the input unit 161. The position of the viewing point 201 of the virtual camera is moved in accordance with movement of the player character that becomes a subject 202. In addition, the player can move the position of the viewing point 201 of the virtual camera by operating the LR buttons of the input unit 161 while the game progresses. In the game space, various events are set, and the events occur based on the position to which the player character moves. However, the occurrence of the events is not directly related to the present invention, and thus, a detailed description thereof is omitted here.

Figure 3:
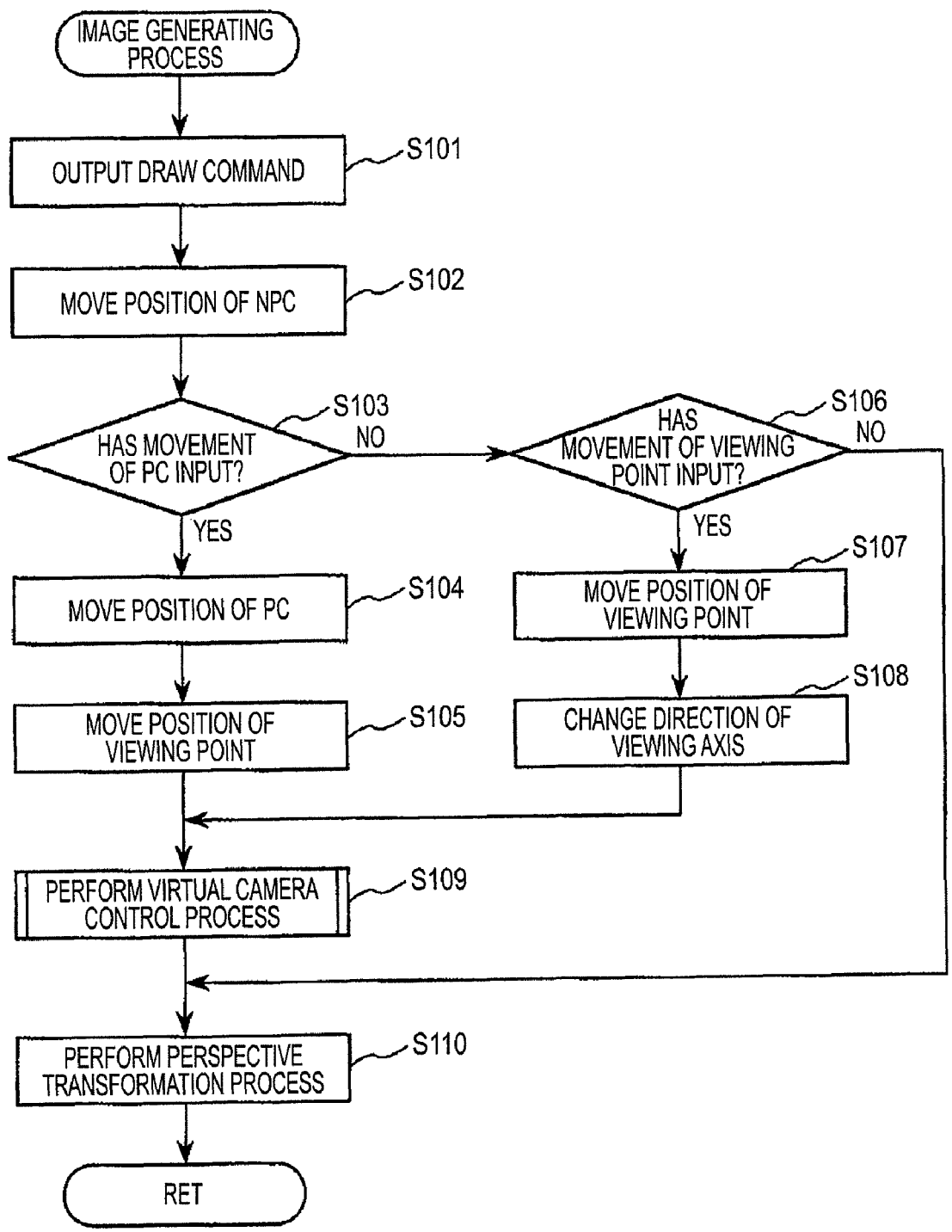
FIG. 3 is a flowchart showing an image generating process, which is performed for each frame period, of a video game according to an embodiment of the present invention.

In the video game according to this embodiment, the progress of a game appears to the player as game screens that are generated in accordance with the progress status of the game for each frame period. FIG. 3 is a flowchart showing an image generating process of the video game according to this embodiment which is performed for each frame period by the control unit 103 for generating image data of an image displayed on the display screen 122 of the display device 121 as a game screen.

When one frame period is started, the control unit 103 transfers coordinates of the vertexes of the polygons constituting each object, which have been transformed into coordinates in the screen coordinate system in the perspective transformation process (Step S110: described later) during the previous frame period, included within the clipping range to the graphic processing unit 111 and outputs a drawing command to the graphic process unit 111 (Step S101).

When the drawing command is output, the graphic process unit 111 records image data in the frame memory 112 (used for recording for this frame period) in accordance with the information on the polygons received from the control unit 103. In addition, the graphic process unit 111 starts reading out the image data from the frame memory 112 (used for read-out for this frame) period at the previous frame period and starts output of video signals corresponding to one frame.

Next, the control unit 103 moves the position of each non-player character existing in the virtual three-dimensional space in accordance with the progress status of the game (Step S102). Here, the positions of all the non-player characters are not needed to be moved. Thus, there may be not a non-player character, of which position is moved, in accordance with the progress status of the game. The same process as is generally performed in this type of video games may be performed for moving the position of the non-player character.

Next, the control unit 103 determines whether a direction for moving the player character that becomes the subject 202 in the virtual three-dimensional space is input based on whether a direction by using the arrow key of the input unit 161 is input (Step S103). When the direction for moving the player character has been input, the control unit 103 moves the position of the player character in the virtual three-dimensional space in accordance with the direction of the viewing axis 203 of the virtual camera and the input direction in a case where the direction for moving the player character has been input (Step S104). Then, the control unit 103 moves the position of the viewing point 201 of the virtual camera in accordance with the movement of the player character (Step S105). Thereafter, the process proceeds to a process of Step S109.

On the other hand, when the direction for moving the player character has not been input, the control unit 103 determines whether a direction for moving the position of the viewing point 201 of the virtual camera is input based on whether a direction is input by using the LR keys of the input unit 161 (Step S106). When the direction for moving the position of the viewing point 201 of the virtual camera has not been input, the position of the viewing point 201 of the virtual camera and the position of the subject 202 are in the same states as for the previous frame. Accordingly, in these positions, an obstacle does not exist within the camera collision 300, and thus the process directly proceeds to a process of Step S110.

On the other hand, when the direction for moving the position of the viewing point 201 of the virtual camera has been input, the control unit 103 moves the position of the viewing point 201 of the virtual camera in accordance with the input direction (Step S107). In addition, the control unit 103 changes the direction of the viewing axis 203 of the virtual camera so as to face the player character (subject 202) in the position of the moved viewing point 201 (Step S108). Then, the process proceeds to a process of Step S109.

In Step S109, the control unit 103 controls the position of the viewing point 201 of the virtual camera to be a position from which an object that becomes an obstacle does not exist within the camera collision 300 by performing a virtual camera control process to be described later in detail. When the position of the viewing point 201 of the virtual camera is finally set by the virtual camera control process, the process proceeds to a process of Step S110.

In Step S110, the control unit 103 performs a perspective transformation process in which coordinates of vertexes of polygons constituting each object existing in the clipping range that is determined based on the position of the viewing point 201 of the virtual camera and the direction of the viewing axis 203 for this frame period, which have been determined in the process up to Step S109, are transformed into coordinates of the screen coordinate system from coordinates of the world coordinate system. Then, when the perspective transformation process is completed, the image generating process for this frame period ends. Then, when the next frame period is started, an image generating process is newly started.

Figure 4:
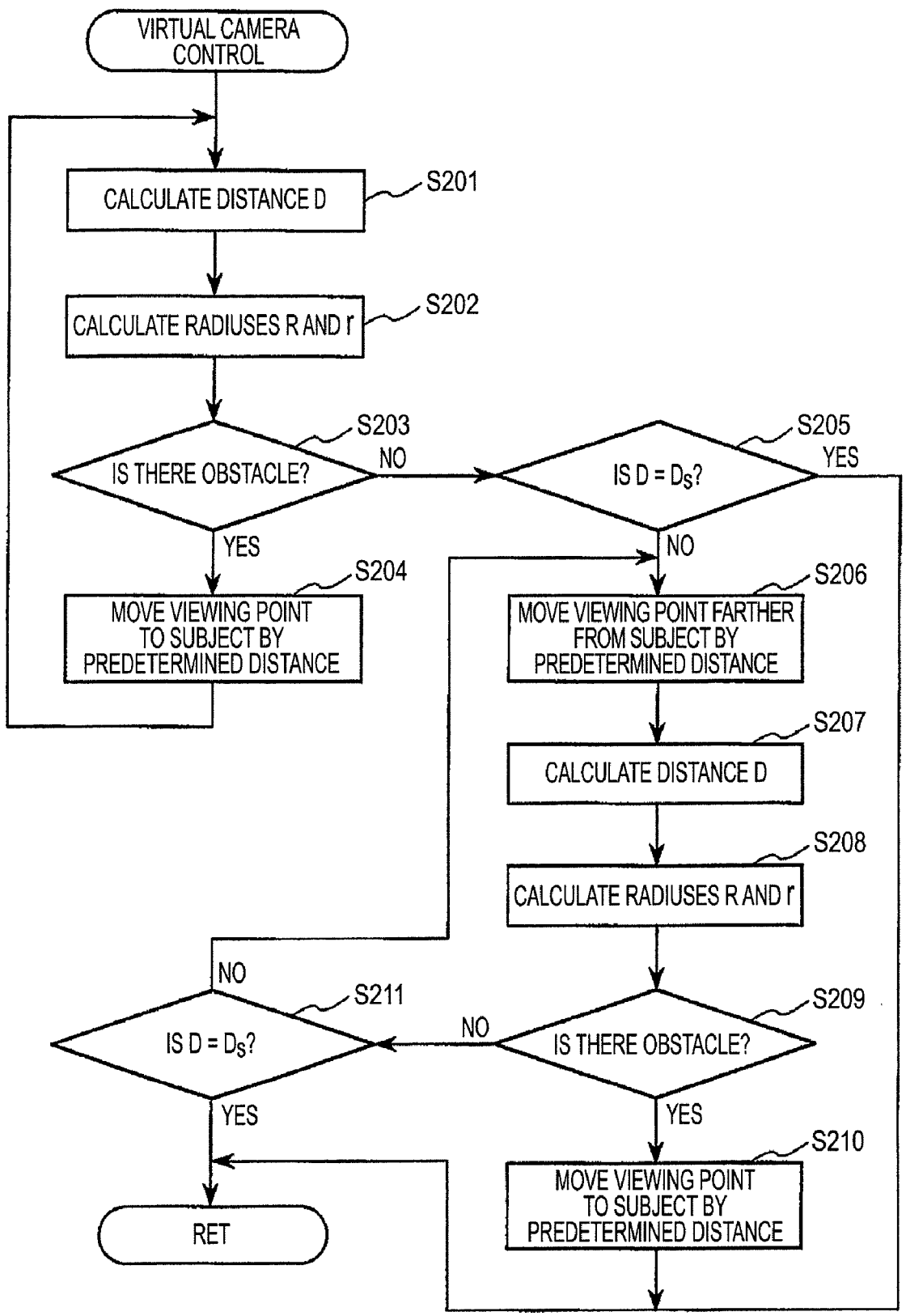
FIG. 4 is a flowchart showing a virtual camera control process shown in FIG. 3 in detail.

FIG. 4 is a flowchart showing the virtual camera control process of Step S109 in detail. In the virtual camera control process, the control unit 103 calculates a distance D between the position of the viewing point 201 of the virtual camera and the position of the subject 202 (player character) at the current time point (Step S201). The control unit 103 calculates the radius R of the camera peripheral area 301 and the radius r of the subject peripheral area 302 by performing calculation of above-described Numeric Equation 1 using the calculated distance D (Step S202).

Next, the control unit 103 determines whether an object that becomes an obstacle other than the player character and non-player characters exists within the range of the camera collision 300 that is determined based on the position of the viewing point 201 of the virtual camera at the current time point, the position of the subject 202, and the calculated radiuses R and r (Step S203). When the object that becomes an obstacle is determined to exist within the range of the camera collision 300 in Step S203, the control unit 103 moves the position of the viewing point 201 of the virtual camera to face the position of the subject 202 and be closer to the position of the subject 202 by a predetermined distance (Step S204). Then, the process proceeds back to the process of Step S201.

When the object that becomes an obstacle is determined not to exist within the range of the camera collision in Step S203, the control unit 103 determines whether the distance D previously calculated in Step S201 is the reference distance $D_s$ (Step S205). When the distance D is the reference distance $D_s$, the position of the viewing point 201 acquired at the current time point becomes the position of the viewing point 201 of the virtual camera for this frame period. Accordingly, the virtual camera control process immediately ends, and the control returns to the flowchart shown in FIG. 3.

When the calculated distance D is not the reference distance $D_s$, the control unit 103 moves the position of the viewing point 201 of the virtual camera to be farther from the position of the subject 202 by a predetermined distance (Step S206). The control unit 103 calculates a distance D between the position of the viewing point 201 of the virtual camera at the current time point and the position of the subject 202 (player character) (Step S207). In addition, the control unit 103 calculates the radius R of the camera peripheral area 301 and the radius r of the subject peripheral area 302 by performing calculation of above-described Numeric Equation 1 using the calculated distance D (Step S208).

Next, the control unit 103 determines whether an object that becomes an obstacle other than the player character and non-player characters exists within the range of the camera collision 300 that is determined based on the positions of the viewing point 201 of the virtual camera at the current time point and the subject 202 and the calculated radiuses R and r (Step S209).

When the object that becomes an obstacle is determined to exist within the range of the camera collision 300 in Step S209, the control unit 103 moves the position of the viewing point 201 of the virtual camera to face the position of the subject 202 and be closer to the subject by a predetermined distance (Step S210). Accordingly, the position of the viewing point 201 acquired at the current time point becomes a position in which the distance D is closest to the reference distance $D_s$ under the condition that an obstacle does not exist within the range of the camera collision 300. Thus, the virtual camera control process is completed, and the process returns to the flowchart shown in FIG. 3.

When the object that becomes an obstacle is determined not to exist within the range of the camera collision 300 in Step S209, the control unit 103 determines whether the distance D previously calculated in Step S201 is the reference distance $D_s$ (Step S211). When the distance D is the reference distance $D_s$, the position of the viewing point 201 acquired at the current time point becomes the position of the viewing point 201 of the virtual camera 201 for this frame period. Accordingly, in such a case, the virtual camera control process immediately ends, and the process returns to the flowchart shown in FIG. 3.

When the distance D is not the reference distance $D_s$ in Step S211, an object that becomes an obstacle does not exist within the range of the camera collision 300 at least at the position of the viewing point 201 of the virtual camera at the current time point. However, there is a possibility that an object that becomes an obstacle does not exist within the range of the camera collision 300 even in a case where the position of the viewing point 201 of the virtual camera is moved to a position in which the distance D becomes closer to the reference distance $D_s$. Accordingly, in such a case, the control unit 103 proceeds back to the process of Step S206 and continues the process.

Hereinafter, in the video game according to this embodiment, movement of the viewing point 201 of the virtual camera according to movement of the subject 202 in an area in which an obstacle exists will be described in detail. FIGS. 5A to 5H and FIGS. 6A to 6G are schematic diagrams showing detailed examples of setting of the camera collision 300 and movement of the position of the viewing point 201 of the virtual camera in a perspective transformation process of a video game according to this embodiment for avoiding an obstacle.

Figure 5A:
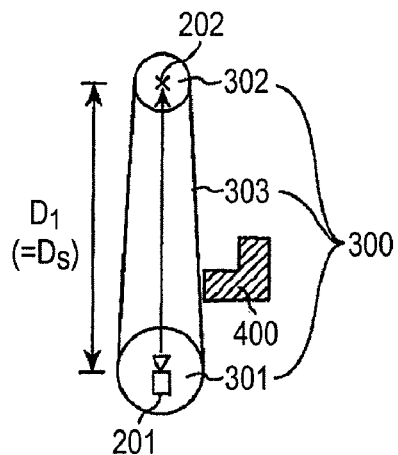
FIGS. 5A to 5H are schematic diagrams showing detailed examples of setting of camera collision and movement of the position of a viewing point of a virtual camera in a video game according to an embodiment of the present invention.
Figure 5B:
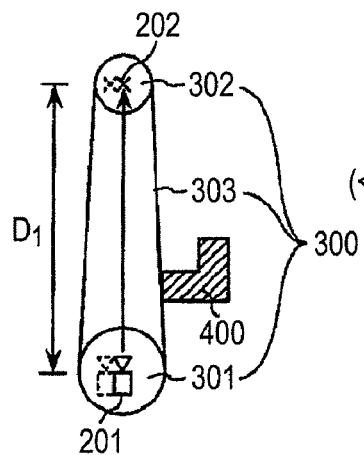

First as shown in FIG. 5A, it is assumed that a distance between the position of the viewing point 201 of the virtual camera and the position of the subject (player character) 202 is $D_1$ ($=D_s$). In addition, it is assumed that an obstacle 400 does not exist within the range of the set camera collision 300 that is constituted by the camera peripheral area 301, the subject peripheral area 302, and the camera-to-subject area 303. Next, as shown in FIG. 5B, it is assumed that the obstacle 400 is within the range of the camera collision 300 in a case where the position of the subject 202 is moved and the position of the viewing point 201 of the virtual camera is moved in accordance with the movement of the subject.

Figure 5C:
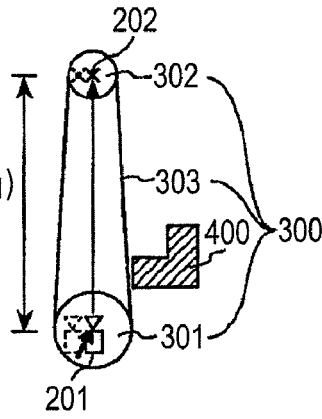
Figure 5D:
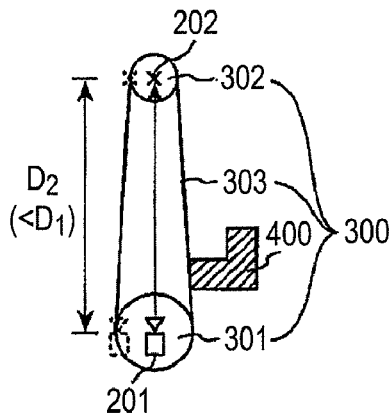

In such a case, as shown in FIG. 5C, the position of the viewing point 201 of the virtual camera becomes closer to the position of the subject 202. When the distance between the position of the viewing point 201 of the virtual camera and the position of the subject (player character) 202 becomes $D_2$ ($<D_1$), the size of the camera collision 300 decreases. In such a case, the obstacle 400 is not located within the range of the camera collision 300 that has the decreased size. First of all, as shown in FIG. 5D, it is assumed that the obstacle 400 is located within the range of the camera collision 300 in a case where the position of the subject 202 is moved further and the position of the viewing point 201 of the virtual camera is moved in accordance with the movement of the subject 202.

Figure 5E:
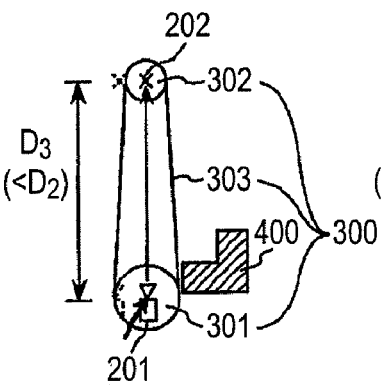
Figure 5F:
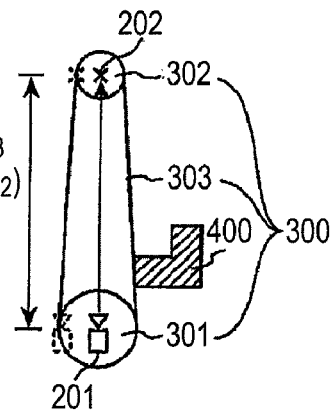

In such a case, as shown in FIG. 5E, the position of the viewing point 201 of the virtual camera becomes much closer to the position of the subject 202. When the distance between the position of the viewing point 201 of the virtual camera and the position of the subject 202 becomes $D_3$ ($<D_2$), the size of the camera collision 300 decreases further. Accordingly, the obstacle 400 is not located within the range of the camera collision 300 that has such a size. First of all, as shown in FIG. 5F, it is assumed that the obstacle 400 is located within the range of the camera collision 300 in a case where the position of the subject 202 is moved further and the position of the viewing point 201 of the virtual camera is moved in accordance with the movement of the subject 202.

Figure 5G:
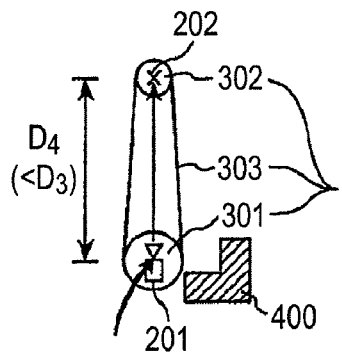
Figure 5H:
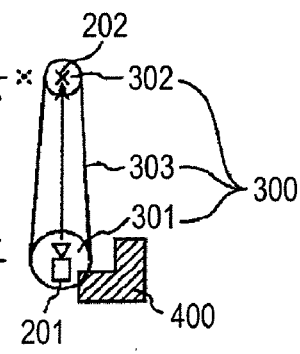

In such a case, as shown in FIG. 5G, the position of the viewing point 201 of the virtual camera becomes much closer to the position of the subject 202. When the distance between the position of the viewing point 201 of the virtual camera and the position of the subject 202 becomes $D_4$ ($<D_3$), the size of the camera collision 300 decreases further. Accordingly, the obstacle 400 is not located within the range of the camera collision 300 that has such a size. First of all, as shown in FIG. 5H, it is assumed that the obstacle 400 is located within the range of the camera collision 300 in a case where when the position of the subject 202 is moved further and the position of the viewing point 201 of the virtual camera is moved in accordance with the movement of the subject 202.

Figure 6A:
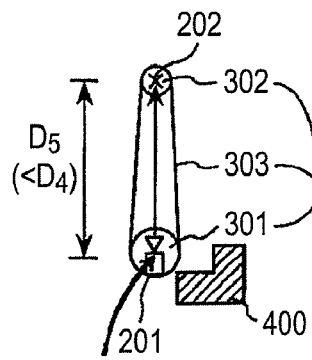
FIGS. 6A to 6G are schematic diagrams showing detailed examples of setting of camera collision and movement of the position of a viewing point of a virtual camera in a video game according to an embodiment of the present invention.
Figure 6B:
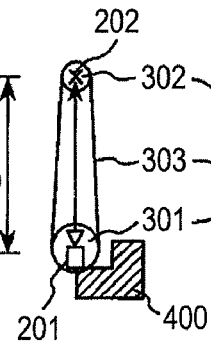

In such a case, as shown in FIG. 6A, the position of the viewing point 201 of the virtual camera becomes much closer to the position of the subject 202. When the distance between the position of the viewing point 201 of the virtual camera and the position of the subject 202 becomes $D_5$ ($<D_4$), the size of the camera collision 300 decreases further. Accordingly, the obstacle 400 is not located within the range of the camera collision 300 that has such a size. First of all, as shown in FIG. 6B, it is assumed that the obstacle 400 is located within the range of the camera collision 300 in a case where the position of the subject 202 is moved further and the position of the viewing point 201 of the virtual camera is moved in accordance with the movement of the subject 202.

Figure 6C:
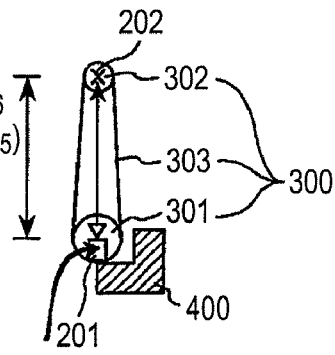
Figure 6D:
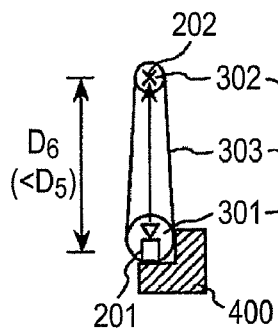

In such a case, as shown in FIG. 6C, the position of the viewing point 201 of the virtual camera becomes much closer to the position of the subject 202. When the distance between the position of the viewing point 201 of the virtual camera and the position of the subject 202 becomes $D_6$ ($<D_5$), the size of the camera collision 300 decreases further. Accordingly, the obstacle 400 is not located within the range of the camera collision 300 that has such a size. First of all, as shown in FIG. 6D, it is assumed that the obstacle 400 is located within the range of the camera collision 300 in a case where the position of the subject 202 is moved further and the position of the viewing point 201 of the virtual camera is moved in accordance with the movement of the subject 202.

Figure 6E:
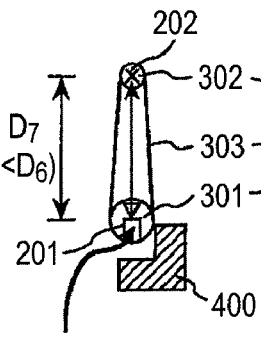
Figure 6F:
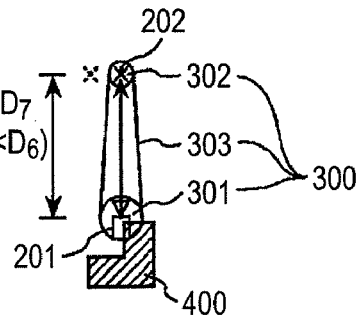

In such a case, as shown in FIG. 6E, the position of the viewing point 201 of the virtual camera becomes much closer to the position of the subject 202. When the distance between the position of the viewing point 201 of the virtual camera and the position of the subject 202 becomes $D_7$ ($<D_6$), the size of the camera collision 300 decreases further. Accordingly, the obstacle 400 is not located within the range of the camera collision 300 that has such a size. First of all, as shown in FIG. 6F, it is assumed that the obstacle 400 is located within the range of the camera collision 300 in a case where the position of the subject 202 is moved further and the position of the viewing point 201 of the virtual camera is moved in accordance with the movement of the subject 202.

Figure 6G:
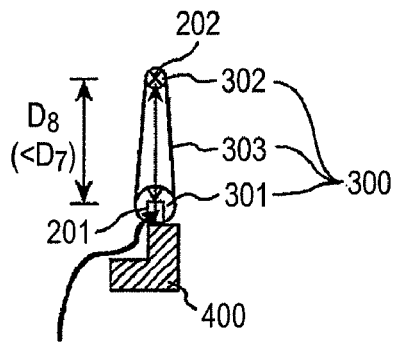

In such a case, as shown in FIG. 6G, the position of the viewing point 201 of the virtual camera becomes much closer to the position of the subject 202. When the distance between the position of the viewing point 201 of the virtual camera and the position of the subject 202 becomes $D_8$ ($<D_7$), the size of the camera collision 300 decreases further. Accordingly, the obstacle 400 is not located within the range of the camera collision 300 that has such a size.

As described above, in the video game according to this embodiment, when the position of the viewing point 201 of the virtual camera is moved at the positions shown in FIGS. 5A, 5C, 5E, 5G and FIGS. 6A, 6C, 6E, and 6G, as denoted by arrows in these figures, the viewing point 201 of the virtual camera is moved in a smooth manner. In particular, as shown in FIGS. 6A, 6C, 6E, and 6G, even when an obstacle is located on a rear side (a side farther than the subject 202) of the position of the viewing point 201 of the virtual camera, the camera peripheral area 301 includes the position of the viewing point 201 of the virtual camera to an area located on the rear side of the position of the viewing point 201. Accordingly, the position of the viewing point 201 of the virtual camera is moved in a smooth manner.

A case where the position of the viewing point 201 of the virtual camera is moved in accordance with the movement of the player character that becomes the subject 202 and thus the obstacle 400 slowly approaches a straight line that connects the position of the viewing point 201 of the virtual camera and the position of the subject 202 has been described with reference to FIGS. 5 and 6. However, even in a case where the position of the viewing point 201 of the virtual camera is moved in accordance with a direction input by using the LR buttons of the input unit 161 and thus the obstacle 400 slowly approaches a straight line that connects the position of the viewing point 201 of the virtual camera and the position of the subject 202, the position of the viewing point 201 of the virtual camera is moved in a smooth manner.

On the other hand, in a case where the obstacle 400 moves slowly far from a straight line that connects the position of the viewing point 201 of the virtual camera and the position of the subject 202 in accordance with movement of the player character that becomes a subject 202 or a direction input by using the LR buttons of the input unit 161, the position of the viewing point 201 of the virtual camera is moved in reverse order of FIGS. 5A, 5C, 5E, and 5G, and FIGS. 6A, 6C, 6E, and 6G. Accordingly, the position of the viewing point 201 of the virtual camera is moved in a smooth manner.

As a comparative example, in a general video game, movement of the viewing point of the virtual camera according to movement of the subject 202 in an area in which an obstacle exists will be described in detail. FIGS. 7A to 7D are schematic diagrams showing detailed examples of movement of the position of the viewing point 201 of the virtual camera according to the general video game for avoiding an obstacle in a perspective transformation process.

Figure 7A:
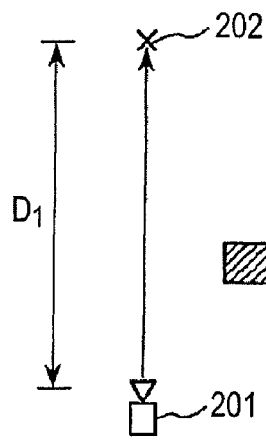
FIGS. 7A to 7H are schematic diagrams showing comparative examples of movement of the position of a viewing point of a virtual camera in a video game according to a general example.

First, as shown in FIG. 7A, a distance between the position of the viewing point 201 of the virtual camera and the position of a subject (player character) 202 is assumed to be $D_1$ (=$D_s$). In addition, the position relationship between the position of the viewing point 201 of the virtual camera and the position of the subject 202 is assumed to be the same as shown in FIG. 5A. Here, an obstacle 400 does not exist between the position of the viewing point 201 of the virtual camera and the position of the subject 202.

Figure 7B:
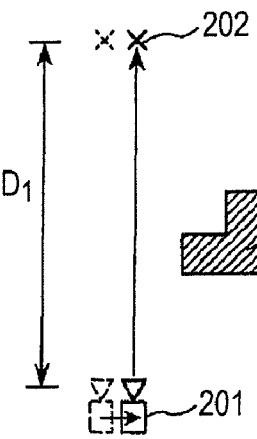

Next, as shown in FIG. 7B, it is assumed that the position of the subject 202 is moved by a same distance as that in a case where the position of the subject is moved from a state shown in FIG. 5A to a state shown in FIG. 5B and the position of the viewing point 201 of the virtual camera is moved in accordance with the movement of the subject 202. Although the obstacle 400 exists within the range of the camera collision 300 in FIG. 5B, an obstacle 400 does not exist between the position of the viewing point 201 of the virtual camera and the subject 202 in FIG. 7B. Accordingly, the position of the viewing point 201 of the virtual camera is not moved close to the position of the subject 202, and a perspective transformation process at this position of the viewing point 201 of the virtual camera is performed.

Figure 7C:
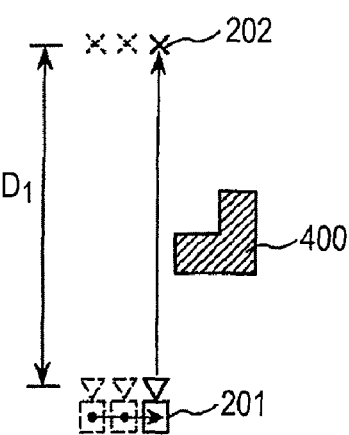

In addition, as shown in FIG. 7C, it is assumed that the position of the subject 202 is moved by a same distance as that in a case where the position of the subject is moved from a state shown in FIG. 5C to a state shown in FIG. 5D and the position of the viewing point 201 of the virtual camera is moved in accordance with the movement of the subject 202. Although the obstacle 400 exists within the range of the camera collision 300 in FIG. 5D, an obstacle 400 does not exist between the position of the viewing point 201 of the virtual camera and the subject 202 in FIG. 7C. Accordingly, the position of the viewing point 201 of the virtual camera is not moved close to the position of the subject 202, and a perspective transformation process at this position of the viewing point 201 of the virtual camera is performed.

Figure 7D:
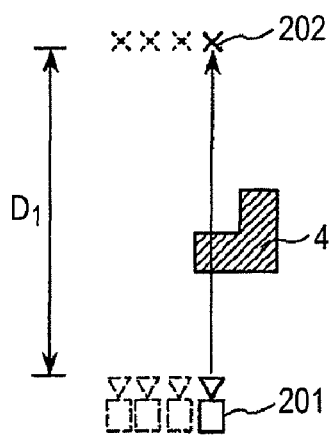

Thereafter, as shown in FIG. 7D, it is assumed that the position of the subject 202 is moved by a same distance as that in a case where the position of the subject is moved from a state shown in FIG. 5E to a state shown in FIG. 5F and the position of the viewing point 201 of the virtual camera is moved in accordance with the movement of the subject 202. In a state shown in FIG. 7D, an obstacle 400 exists between the position of the viewing point 201 of the virtual camera and the subject 202.

Figure 7E:
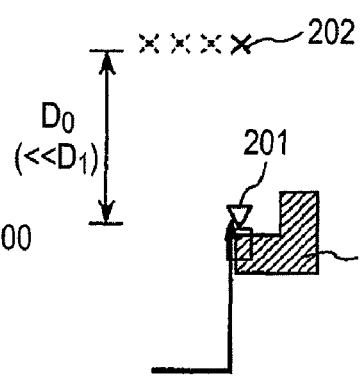

Thus, as shown in FIG. 7E, the position of the viewing point 201 of the virtual camera is moved to such a position that an obstacle 400 does not exist between the position of the viewing point 201 of the virtual camera and the subject 202, that is, a distance D between the position of the viewing point 201 of the virtual camera and he subject 202 becomes $D_0$ ($\ll D_1$). Thereafter, as shown in FIG. 7F, the position of the viewing point 201 of the virtual camera is moved in accordance with the movement of the position of the subject 202 with the distance from the position of the subject 202 maintained to be fixed.

Figure 7F:
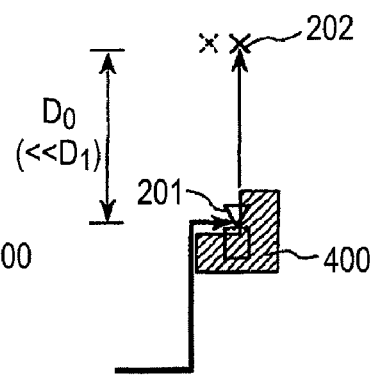
Figure 7G:
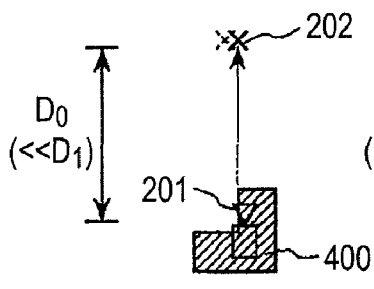

Thereafter, as shown in FIG. 7G, it is assumed that the position of the subject 202 is moved and the position of the viewing point 201 of the virtual camera is moved in accordance with the movement of the subject 202 until an obstacle 400 exists between the position of the viewing point 201 of the virtual camera and the subject 202. Accordingly, as shown in FIG. 7H, the position of the viewing point 201 of the virtual camera is moved to such a position that an obstacle 400 does not exist between the position of the viewing point 201 of the virtual camera and the subject 202, that is, a position that the distance D between the position of the viewing point 201 of the virtual camera and the subject 202 becomes $D_{00}$ ($\ll D_0$).

Figure 7H:
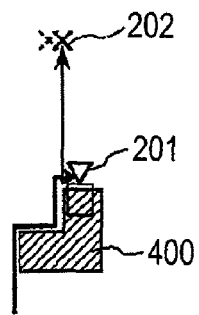

As described above, in the general video game according to the comparative example, when the position of the viewing point 201 of the virtual camera is moved to positions shown in FIGS. 7A, 7B, 7C, 7E, 7F, and 7H, as denoted by arrows shown in FIGS. 7E, 7F, and 7H, the position of the viewing point 201 of the virtual camera is moved abruptly.

As described above, in the video game according to this embodiment, a perspective transformation process is performed by setting the player character as a subject 202, and a game image to be displayed as the display screen 122 of the display device 121 is generated for each one frame period. Here, when the player inputs a direction by using an arrow key of the input unit 161, the player character that becomes the subject 202 is moved in a direction according to the input direction, and the position of the viewing point 201 of the virtual camera is moved in accordance with the movement of the player character. In addition, when the player inputs a direction by using the LR buttons of the input unit 161, the position of the viewing point 201 of the virtual camera is rotated or moved in the polar coordinate system with the direction of the viewing axis 203 of the virtual camera changed to face the player character that becomes the subject 202.

As described above, the position of the viewing point 201 of the virtual camera is moved in accordance with the movement of the player character that becomes the subject 202 or is moved in accordance with the input by using the LR buttons of the input unit 161. However, when an obstacle exists within the range of the camera collision 300, the position of the viewing point 201 of the virtual camera is moved toward the position of the subject 202 until the position of the viewing point becomes such a position that an obstacle does not exist within the range of the camera collision 300.

Here, the camera collision 300 is configured by a camera peripheral area 301 that is set as a sphere having the viewing point 201 of the virtual camera as its center and having a radius of R, a subject peripheral area 302 that is set as a sphere having the subject 202 as its center and having a radius of r, and a camera-to-subject area 303 having a circular truncated cone shape disposed therebetween. When the distance D between the position of the viewing point 201 of the virtual camera and the position of the subject 202 becomes smaller than the reference distance $D_s$, the radius R of the camera peripheral area 301 and the radius r of the subject peripheral area 302 become smaller than radiuses Rs and rs that are standard values at the reference distance Ds, and accordingly, the size of the camera collision 300 is configured to decrease.

Accordingly, in a case where an obstacle exists in a position relatively far from the position of the viewing point 201 of the virtual camera which is located within the range of the camera collision 300, when the position of the viewing point 201 of the virtual camera is moved close to the position of the subject 202, the size of the camera collision 300 decreases. Accordingly, the position of the viewing point 201 of the virtual camera can be determined by regarding a position close to the position of the subject 202 as a position for which an obstacle does not exist within the range of the camera collision 300.

Accordingly, for example, in a case where a distance between a straight line connecting the position of the viewing point 201 of the virtual camera and the position of the subject 202 together and the obstacle slowly decreases, the position of the viewing point 201 of the virtual camera can be slowly moved closer to the position of the subject 202 with facing toward the position of the subject 202. When an obstacle is located in the middle of the straight line, the position of the viewing point 201 of the virtual camera has been considerably moved to the subject 202 side right before the obstacle is located in the middle of the straight line. Accordingly, even when the viewing point 201 of the virtual camera is moved to a position having a shorter distance from the subject 202 than the obstacle, the position of the viewing point 201 of the virtual camera is not moved abruptly.

On the other hand, in a case where the distance between a straight line connecting the position of the viewing point 201 of the virtual camera and the position of the subject 202 together and the obstacle slowly increases, when the position of the viewing point 201 of the virtual camera is moved much farther from the subject 202 at once, the camera collision 300 increases, and thus, an obstacle is located within the camera collision 300. Accordingly, the position of the viewing point 201 of the virtual camera is slowly moved farther from the position of the subject 202.

As described above, in the video game according to this embodiment, even when the position of the viewing point 201 of the virtual camera is controlled such that locating an obstacle between the position of the viewing point 201 of the virtual camera and the position of the subject 202 is avoided, the position of the viewing point 201 of the virtual camera is configured to be smoothly moved. Accordingly, a player who watches the image displayed on the display screen 122 of the display device 121 does not acquire a feeling of strangeness due to a change of the displayed image. In addition, since the position of the viewing point 201 of the virtual camera is not abruptly changed, the player does not acquire camera sickness by watching the displayed image.

In addition, a perspective transformation process is not performed for an obstacle existing within the range of the camera collision 300. Accordingly, an object that is originally hidden by an obstacle and is not visible in the image displayed on the display screen 122 of the display device 121 is not visually recognized by the player. Accordingly, a player watching the image displayed on the display screen 122 of the display device 121 does not acquire a feeling of strangeness from an object visually recognized in the displayed image.

In addition, the camera peripheral area 301 and the subject peripheral area 302 are configured to be included in the spheres having the position of the viewing point 201 of the virtual camera and the position of the subject 202 as their centers. Accordingly, whether an obstacle exists in the camera peripheral area 301 or the subject peripheral area 302 of the camera collision 300 can be easily determined by calculating distances among the position of the viewing point 201 of the virtual camera, the position of the subject 202, and vertexes of polygons constituting each object that can be an obstacle. In addition, even when the sizes of the camera peripheral area 301 and the subject peripheral area 302 are changed in accordance with the distance between the position of the viewing point 201 of the virtual camera and the position of the subject 202, the calculation process is not complex.

In addition, the camera peripheral area 301 constituting the camera collision 300 is formed by a sphere having the position of the viewing point 201 of the virtual camera as its center, and includes an area located farther than the position of the viewing point 201 from the position of the subject 202. Accordingly, even when the position of the viewing point 201 of the virtual camera is moved to a position closer to the subject 202 than the position of the obstacle, the position of the viewing point 201 can be smoothly moved continuously.

In addition, the camera collision 300 includes the subject peripheral area 302 that is set as a sphere area having the position of the subject 202 as its center. Accordingly, even in a case where an obstacle is slowly moved closer to a straight line connecting the position of the viewing point 201 of the virtual camera and the position of the subject 202 at a position that is very close to the position of the subject, locating an obstacle between the position of the viewing point 201 of the virtual camera and the position of the subject 202 can be avoided with the position of the viewing point 201 of the virtual camera smoothly moved.

The present invention is not limited to the above-described embodiment, and various changes in form or applications can be made therein. Hereinafter, modified examples of the above-described embodiment of the present invention will be described.

In the above-described embodiment, the position of the viewing point 201 of the virtual camera is set to a position located at the reference distance $D_s$ even in a case where the distance D from the position of the subject 202 is the maximum. However, the position of the viewing point 201 of the virtual camera may be set to a position located at a distance D longer than the reference distance $D_s$. In such a case, the radius R of the camera peripheral area 301 and the radius r of the subject peripheral area 302 may be configured to be larger than the standard value $R_s$ and $r_s$, which are values for a case where the distance D is the reference distance $D_s$, in a case where the distance D between the position of the viewing point 201 of the virtual camera and the position of the subject 202 is longer than the reference distance $D_s$.

In the above-described embodiment, the direction of the viewing axis 203 of the virtual camera is controlled to be aligned toward the player character all the time. In other words, the player character is controlled as a subject 202. However, the object that becomes the subject 202 toward which the viewing axis 203 of the virtual camera is aligned is not necessarily limited to the player character. The object that becomes the subject 202 may be an object such as a transparent object having no color or an object having no width that is not displayed on the display screen 122.

In the above-described embodiment, when an object that becomes an obstacle does not exist within the range of the camera collision 300, the position of the viewing point 201 of the virtual camera is configured to be moved in accordance with the movement of the position of the player character that becomes the subject 202 except for a case where it is moved in accordance with the input of a direction by using the LR buttons of the input unit 161. However, in a case where not only the position of the player character but also the direction thereof is changed in accordance with the input of a direction by using the arrow keys of the input unit 161, the position of the viewing point 201 of the virtual camera may be configured to be moved in accordance with a change of the direction.

In addition, the position of the viewing point 201 of the virtual camera may be configured to be moved in full accordance with the movement of the position (and a change of the direction) of the player character that becomes the subject 202, except for a case where the position of the viewing point 201 of the virtual camera is moved due to existence of an object that becomes an obstacle within the range of the camera collision 300. In addition, although the position of the viewing point 201 of the virtual camera is, for example, rotated about the subject 202 in accordance with input of a direction by using the L1 button or the R1 button, the position of the viewing point 201 may be configured not to be moved in the polar coordinate direction.

In addition, except for a case where an obstacle is avoided by adjusting the distance between the subject 202 and the viewing point 201 of the virtual camera, the position of the viewing point 201 of the virtual camera may be configured to be controlled by using any known technique under a condition that the angle of the viewing axis 203 is controlled such that the viewing axis 203 is aligned toward the subject 202 without changing the distance between the subject 202 and the virtual camera 201 as possibly as can be. For example, when the distance D between the position of the viewing point 201 of the virtual camera and the position of the subject 202 is within a predetermined range, the virtual camera is configured to be in accordance with the subject 202 by controlling only the angle of the viewing axis 203 (without changing the distance between the subject 202 and the viewing point 201 of the virtual camera) with the position of the viewing point 201 fixed even in a case where the position of the subject 202 is moved. On the other hand, when subject 202 is moved to such a position that the distance D becomes beyond the predetermined range, the position of the viewing point 201 of the virtual camera may be configured to be moved to a such position that the distance D becomes within the predetermined range.

In the above-described embodiment, locating an obstacle within the range of the camera collision 300 is avoided by moving the position of the viewing point 201 of the virtual camera to the side of the subject 202 in a case where the obstacle exists within the range of the camera collision 300. However, the moving direction of the viewing point 201 of the virtual camera for avoiding an obstacle is not limited to the side of the subject 202. A method in which the viewing point 201 of the virtual camera is moved to the side of the subject 202 and a method in which the viewing point 201 of the virtual camera is moved in another direction may be used together depending on the situations. In addition, any two or more of various techniques described below for moving the position of the viewing point 201 of the virtual camera in another direction may be used together.

For example, the position of the viewing point 201 of the virtual camera may be configured to be moved to the upper side in polar coordinates until an obstacle does not exist within the range of the camera collision 300. In addition, the position of the viewing point 201 of the virtual camera may be configured to be moved in the direction of axis Z in the virtual three-dimensional space until an obstacle does not exist within the range of the camera collision 300. In addition, in a case where the position of the viewing point 201 of the virtual camera is moved with the height of the viewing point 201 maintained at a constant value, when an obstacle exists within the range of the camera collision 300, the position of the viewing point 201 of the virtual camera may be turned to the left side or the right side, so that the obstacle does not locate within the range of the camera collision 300.

The position of the viewing point 201 of the virtual camera may be configured to be moved to any position in the virtual three-dimensional space with the viewing axis 203 aligned toward the subject 202, in any of a case where the position of the viewing point 201 of the virtual camera is moved to the side of the subject 202, a case where the position of the viewing point 201 of the virtual camera is moved to the upper or lower side in polar coordinates, a case where the position of the viewing point 201 of the virtual camera is turned to the left or right side, and a case where the above-described cases are combined for avoiding an obstacle.

In the above-described embodiment, objects other than the player character and non-player characters of which positions in the virtual three-dimensional space are not changed are configured as objects that can be obstacles in a perspective transformation process. However, objects (may include non-player characters that do not become subjects 202) of which positions are changed in the virtual three-dimensional space may be configured as objects that can be obstacles in a perspective transformation process.

In a case where an object of which position is changed in the virtual three-dimensional space can be an obstacle, even when the position of the viewing point 201 of the virtual camera and the position of the subject 202 are not moved, an object that becomes an obstacle may exist within the range of the camera collision 300 as the object that can be an obstacle is moved. In such a case, the virtual camera control process (FIG. 3) of Step S109 is performed, and the position of the viewing point 201 of the virtual camera is moved such that an object that becomes an obstacle is not included within the range of the camera collision 300.

In addition, the above-described embodiment has been described on a premise that the game is a standalone-type video game. Accordingly, all the characters other than the player character have been described as non-player characters. However, in a network game in which each player participates in the game from a plurality of video game devices 100 connected to one another through a network 151, play characters corresponding to the players exist in the virtual three-dimensional space. In such a case, player characters corresponding to other players may be configured as objects that can be obstacles in a perspective transformation process or objects that cannot be obstacles. In addition, only player characters of players having specific relationship in the game may be configured as objects that cannot be obstacles.

In the above-described embodiment, the position of the viewing point 201 of the virtual camera is configured to be moved farther from the position of the subject 202 to such a position that the distance D between the position of the viewing point 201 of the virtual camera and the position of the subject 202 is closest to the reference distance $D_s$, under a condition that an object that becomes an obstacle does not exist within the range of the camera collision 300. First of all, particularly in a case where an object that becomes an obstacle is moved in the virtual three-dimensional space or may abruptly disappear from the virtual three-dimensional space, when the position of the viewing point 201 of the virtual camera is moved at once in one frame period until the distance D becomes the reference distance $D_s$, the position of the viewing point 201 may be moved too abruptly.

Accordingly, even when an object that becomes an obstacle does not exist within the range of the camera collision 300, the position of the viewing point 201 of the virtual camera may be configured to be moved such that the distance D becomes close to the reference distance $D_s$ under a condition that a difference between the distance D in the previous frame period and the distance D in the current frame period is within a predetermined range. For example, when it is determined that an obstacle does not exist within the range of the camera collision 300 in the process of Step S209 shown in FIG. 4, the above-described technique can be implemented by immediately ending the virtual camera control process.

In the above-described embodiment, although the size of the camera collision 300 is changed in accordance with the distance D between the position of the viewing point 201 of the virtual camera and the position of the subject 202, the field of view of the virtual camera is set to a predetermined angle all the time. Accordingly, when the position of the viewing point 201 of the virtual camera is located close to the subject 202, the size of the range displayed in an image generated by the perspective transformation process changes. Thus, it may be configured that the size of the field of view of the virtual camera is also changed in accordance with the distance D between the position of the viewing point 201 of the virtual camera and the position of the subject 202.

Accordingly, the size of the range of the virtual three-dimensional space displayed as the display screen 122 can be maintained at an almost same size regardless of a change in the distance D between the position of the viewing point 201 of the virtual camera and the position of the subject 202. Accordingly, even when the position of the viewing point 201 of the virtual camera is moved closer or farther to/from the position of the subject 202 for avoiding an obstacle, the player does not acquire much of a feeling of strangeness from the screen.

In the above-described embodiment, the radius R of the camera peripheral area 301 and the radius r of the subject peripheral area 302 that constitute the camera collision 300 are configured to be changed in accordance with the distance D between the position of the viewing point 201 of the virtual camera and the position of the subject 202. On the contrary, it may be configured that the radius R of the camera peripheral area 301 is changed in accordance with the distance D and the radius r of the subject peripheral area 302 is configured to be fixed regardless of the distance D. First of all, in a case where the radius r of the subject peripheral area 302 is changed in accordance with the distance D, the viewing point 201 of the virtual camera can be moved smoothly.

In the above-described embodiment, the size (the radius R of the camera peripheral area 301 and the radius r of the subject peripheral area 302) of the camera collision 300 can be determined in accordance with the distance D between the position of the viewing point 201 of the virtual camera and the position of the subject 202. First of all, depending on a difference of progress statuses of the game, there are a case where smoothly moving the position of the viewing point 201 of the virtual camera generates a realistic image and a case where markedly changing the position of the viewing point 201 of the virtual camera generates a realistic image. In addition, in a scene including many objects that can be obstacles, when the size of the camera collision 300 is too large, the amount of movement of the position of the viewing point 201 of the virtual camera for avoiding the obstacles may be too much.

Thus, in accordance with not only the distance D between the position of the viewing point 201 of the virtual camera and the position of the subject 202 but also a difference of game scenes, the size (the radius R of the camera peripheral area 301 and/or the radius r of the subject peripheral area 302) of the camera collision 300 may be configured to be changed. As a method of changing the size of the camera collision 300 in accordance with a difference of the game scenes, a method in which basic sizes (standard values of radiuses R and r) of the camera collision 300 for each scene are set in advance may be used or a method in which the basic size (standard values of radiuses R and r) of the camera collision 300 is dynamically changed based on determination of the game scene may be used.

Here, as the difference of the game scenes which changes the size of the camera collision 300, for example, a difference between a day scene and a night scene may be applied. Generally in a real world, when it is bright, a cameraman can move to avoid an obstacle after he moves to the right front of the obstacle. On the other hand, when it is dark, the cameraman quickly takes an action of avoiding an obstacle for avoiding collision with the obstacle. Thus, the difference between a day scene and a night scene may be used. In such a case, a realistic image depending on the status of the game can be generated. As a technique for changing the size of the camera collision 300 in accordance with the difference between a day scene and a night scene, a technique in which the size of the camera collision 300 is changed dynamically can be appropriately used.

In addition, as the difference of the game scenes which changes the size of the camera collision 300, for example, a difference between a scene having a large number of objects that can be obstacles and a scene having a small number of objects that can be obstacles may be used. In such a case, for a scene having a large number of objects that can be obstacles, control of the position of the viewing point 201 of the virtual camera for avoiding locating an obstacle within the camera collision 300 may be performed not too frequently. Since there are many cases where the number of objects that can become obstacles is determined for each place in advance, as a technique for changing the size of the camera collision 300 in accordance with the difference between a scene having a large number of objects that can become obstacles and a scene having a small number of objects that can become obstacles, a technique in which the basic size of the camera collision 300 is determined for each place can be appropriately used.

In the above-described embodiment, the camera collision 300 is configured by the camera peripheral area 301 that is formed as the sphere having the radius of R, the subject peripheral area 302 that is formed as the sphere having the radius of r, and the camera-to-subject area 303 formed as a circular truncated cone shape. In addition, both the radius R of the camera peripheral area 301 and the radius r of the subject peripheral area 302 are changed in accordance with the distance D between the position of the viewing point 201 of the virtual camera and the position of the subject 202.

On the contrary, since there is no problem in a case where an obstacle exists on the rear side of the subject 202 with respect to the position of the viewing point 201 of the virtual camera, the subject peripheral area 302 may be configured as a half-sphere area having a part of a sphere area which is close to the viewing point 201 of the virtual camera instead of the sphere area. When the camera-to-subject area 303 is set as an area having a circular truncated cone shape, the subject peripheral area 302 may not exist.

In addition, the subject peripheral area 302 may be configured not to be included in the camera collision 300, and the camera collision 300 may be configured by the camera peripheral area 300 and a camera-to-subject area having a cone shape, which has the position of the subject 202 as its vertex, that is formed between the camera peripheral area 300 and the position of the subject. In such a case, whether an object that becomes an obstacle exists in the camera-to-subject area can be determined based on angles formed by the position of the viewing point 201 of the virtual camera and the position of each vertex of the object that can be an obstacle with respect to the position of the subject 202 and a distance between the position of the subject 202 and the position of an expanded point of the object that can be an obstacle.

In addition, when the camera peripheral area 301 and the subject peripheral area 302 are included in the camera collision 300, only one between the radius R of the camera peripheral area 301 and the radius r of the subject peripheral area 302 may be configured to be changed in accordance with the distance D between the position of the viewing point 201 of the virtual camera and the position of the subject 202.

In addition, when the camera peripheral area 301 and the subject peripheral area 302 have sphere shapes, the shape of the camera-to-subject area 303 is ideally a circular truncated cone shape (or a cone shape for a case where the subject peripheral area 302 is not included in the camera collision 300). However, in order to reduce processing load of the control unit 103, the shape of the camera-to-subject area 303 may be formed as a pyramid (or a frustum of pyramid). In such a case, although the bottom face of the pyramid (or the frustum of pyramid) becomes closer to the ideal shape as the vertexes of a polygon formed as the pyramid increase, however, the processing load of the control unit 103 is increased as the vertexes of the polygon increase. Accordingly, an appropriate number of vertexes can be set by balancing the processing load of the control unit 103 and the ideal shape. In addition, shapes of the camera peripheral area 301 and/or the subject peripheral area 302 may be formed as polyhedrons. In addition, the shapes of the camera peripheral area 301 and/or the subject peripheral area 302 may be an oval sphere having its major axis along the direction from the position of the viewing point 201 of the virtual camera to the position of the subject 202.

In addition, the camera peripheral area 301 may be set as not an area having the position of the viewing point 201 of the virtual camera as its center, but an area having a position slightly closer to the subject 202 than the position of the viewing point 201 of the virtual camera as its center. For example, when the camera peripheral area 301 is to be configured as a sphere having the radius of R, the center position of the camera peripheral area 301 may be set to a position closer to the subject 202 by a predetermined distance, which is shorter than R, than the position of the viewing point 201 of the virtual camera. In addition, the shapes of the camera peripheral area 301 and/or the subject peripheral area 302 may be polyhedrons (not regular polyhedrons) having its length in the height direction shorter than that in the horizontal direction. In such a case, the camera-to-subject area 303 becomes an oval pyramid (oval frustum of pyramid)

In addition, when the position of the viewing point 201 of the virtual camera is moved with the height in the horizontal direction maintained, the camera collision 300 may have a plane shape (for example, the camera peripheral area 301 and the subject peripheral area 302 are configured as a circular shape, and the camera-to-subject area 303 is configured as a trapezoid shape). Here, although there is a constraint of the condition that the position of the viewing point 201 of the virtual camera is moved with the height in the horizontal direction maintained, the camera collision 300 can be set as a plane shape under the condition. Accordingly, it is possible to determine whether an obstacle exists in the camera collision 300 by performing a small amount of calculation.

In the above-described embodiment, the camera collision 300 includes the camera peripheral area 301 that is set to have the position of the viewing point 201 of the virtual camera as its center, and the subject peripheral area 302 that is set to have the position of the subject 202 as its center, and the camera-to-subject area 303 therebetween. In other words, the camera collision includes not only the position of the viewing point 201 of the virtual camera but also the position of the subject 202. In addition, when an object that becomes an obstacle exists in the camera collision 300, the position of the viewing point 201 of the virtual camera is moved to the subject 202 side.

First of all, in a case where the object that becomes an obstacle exists within the range of the camera collision 300, when the position of the viewing point 201 of the virtual camera is too close to the subject 202, the subject 202 is not included in the clipping range. Accordingly, although the position of the viewing point 201 of the virtual camera is moved to any side, the subject 202 is not displayed on the display screen 122. In addition, even in a case where the subject 202 is included in the clipping range, when the subject is too close to the position of the viewing point 201 of the virtual camera, only a part of a player character that becomes the subject 202 is enlarged to be displayed.

In order to avoid the above-described problems, for example, in a case where an object that becomes an obstacle exists within the range of the camera collision 300, basically the position of the viewing point 201 of the virtual camera is moved closer to the position of the subject 202 so as to avoid the object. However, when the object that becomes the obstacle exists in a position that is located very close to the position of the subject 202, the position of the viewing point 201 of the virtual camera may be configured to be moved in a different direction, for example, in the upper direction of polar coordinates.

Alternatively, in a case where an object that becomes an obstacle exists in a position that is located very close to the position of the subject 202, even when the object that becomes the obstacle exists within the range of the camera collision 300, the position of the viewing point 201 of the virtual camera may be configured not to be moved to the subject 202 side. Although the camera collision 300 is set to include a position near the subject 202, the camera collision may be set as an area that does not include the position of the subject 202.

In such cases, in a case where an object that becomes an obstacle exists in a position that is located very close to the position of the subject 202, when the object that becomes the obstacle exists between the position of the viewing point 201 of the virtual camera and the position of the subject 202, the subject 202 is not displayed on the display screen 122. First of all, even in such a case, the subject 202 can be displayed by moving the position of the viewing point 201 of the virtual camera by the player's operating the LR buttons of the input unit 161. Accordingly, in such a case, particular difficulty does not occur.

In the above-described embodiment, the reference distance $D_s$ for the distance D between the position of the viewing point 201 of the virtual camera and the position of the subject 202 is set, and the radiuses R and r of the camera peripheral area 301 and the subject peripheral area 302 at the reference distance $D_s$ are set as standard values $R_s$ and $r_s$. Then, the radius R of the camera peripheral area 301 and the radius r of the subject peripheral area 302 are calculated in accordance with the distance D between the position of the viewing point 201 of the virtual camera and the position of the subject 202. However, setting the reference distance $D_s$ and the standard values $R_s$ and $r_s$ in advance is not necessarily needed. For example, the radius R of the camera peripheral area 301 and the radius of the subject peripheral area 302 may be calculated by using Numeric Equation 2.

$$R = a \times D^c \qquad \text{Numeric Equation 2}$$
$$r = b \times D^d$$

where, a, b, c, and d are specific constants, and it may be set that c is equal to d.

In addition, a calculation equation that is not in accordance with Numeric Equation 1 or Numeric Equation 2 may be used under a condition that the radius R of the camera peripheral area 301 (and the radius r of the subject peripheral area 302) decreases as the distance D between the position of the viewing point 201 of the virtual camera and the position of the subject 202 decreases. In addition, when the camera peripheral area 301 (and the subject peripheral area 302) is not a sphere-shaped area, the size of the camera peripheral area 301 (and the subject peripheral area 302) may be configured to be calculated by using any calculation equation under a condition that the size of the camera peripheral area 301 (and the subject peripheral area 302) decreases as the distance D between the position of the viewing point 201 of the virtual camera and the position of the subject 202 decreases.

In the above-described embodiment, a lower distance limit for the distance D between the position of the viewing point 201 of the virtual camera and the position of the subject 202 is not set. First of all, in a case where the position of the viewing point 201 of the virtual camera is moved to a location that is too close to the position of the subject 202, even when the subject 202 is included in the clipping range, the size of the subject 202 in the game image displayed as the display screen 122 may be too large or an object other than the subject 202 may not be projected in the game image. In order to solve these problems, a predetermined lower distance limit for the distance D between the position of the viewing point 201 of the virtual camera and the position of the subject 202 may be set.

Figure 8A:
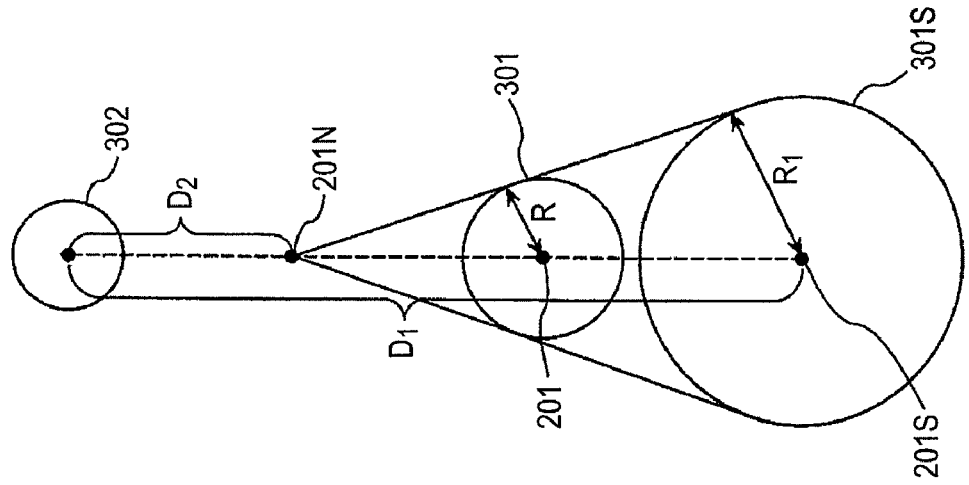
FIGS. 8A and 8B are diagrams showing examples of camera collision in a case where a lower distance limit is set for a distance between the position of the viewing point of the virtual camera and the position of a subject.
Figure 8B:
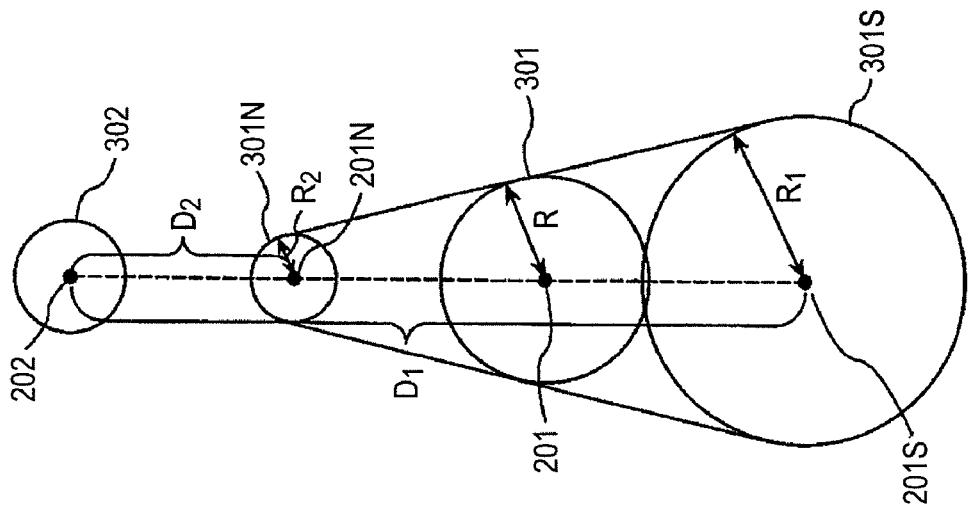

FIGS. 8A and 8B are diagrams showing examples of the camera collision in a case where the lower distance limit is set for the distance D between the position of the viewing point 201 of the virtual camera and the position of the subject 202. Here, a standard distance between the position of the viewing point 201 of the virtual camera and the position of the subject 202 is assumed to be $D_1$, and a lower distance limit is assumed to be $D_2$. In addition, the radius R of the camera peripheral area 301S in a case where the distance D between the position of the viewing point 201S of the virtual camera and the position of the subject 202 is $D_1$ is assumed to be $R_1$.

In the example shown in FIG. 8A, the radius R of the camera peripheral area 301N for a case where the distance D between the position of the viewing point 201N of the virtual camera and the position of the subject 202 is the lower distance limit $D_2$ is assumed to be $R_2$ (>0). In such a case, the radius of the camera peripheral area 301 may be configured to be calculated in accordance with the distance D between the position of the viewing point 201 of the virtual camera and the position of the subject 202 by using Numeric Equation 3.

$$R = R_2 + (R_1 - R_2) \times (D - D_2)/(D_1 - D_2) \qquad \text{Numeric Equation 3}$$

In the example shown in FIG. 8B, the radius R of the camera peripheral area 301N for a case where the distance D between the position of the viewing point 201N of the virtual camera and the position of the subject 202 is the lower distance limit $D_2$ is assumed to be zero. In such a case, the radius of the camera peripheral area 301 may be configured to be calculated in accordance with the distance D between the position of the viewing point 201 of the virtual camera and the position of the subject 202 by using Numeric Equation 4.

$$R = R_1 \times (D - D_2)/(D_1 - D_2) \qquad \text{Numeric Equation 4}$$

In the above-described embodiment, an image generating technique according to the present invention is used for generating images in a video game and is applied to a video game device 100 that is a dedicated game device as a terminal device used for progressing a game by each player. However, the present invention may be applied to generating an image that is not used for a video game, as long as the image is generated by using three-dimensional computer graphics.

In addition, a device that performs an image generating process using the technique according to the present invention may be a general-purpose computer as long as it includes same constituent elements as the video game device 100 and has a function for drawing an image. In addition, the technique according to the present invention may be applied to a portable game device (including a cellular phone having a function for executing an application) having a configuration in which a display device 121 and a sound output device 125 are housed in a same casing as the main body 101, as long as it can process three dimensional computer graphics.

As the recording medium 131, a semiconductor memory card instead of a DVD-ROM or a CD-ROM may be used. A card slot for inserting the memory card may be provided instead of the DVD/CD-ROM drive 113. For the general-purpose personal computer, a program and data according to an embodiment of the present invention may be stored in the HDD 107 in advance, instead of storing them in the recording medium 131. As the recording medium for storing and providing the program and the data according to an embodiment of the present invention, an arbitrary one depending on the physical shape of hardware and a distribution form may be used.

In the above-described embodiment, the program and data of the video game device 100 are configured to be stored in the recording medium 131 to be distributed. However, it may be configured that the program and data are stored in a fixed disc device included in a server existing on the network 151 and the program and the data are distributed to the main body 101 through the network 151. In the video game device 100, the program and data received from the server by a communication interface 115 are stored in the HDD 107, and the program and data may be loaded into the RAM 105 for execution.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

What is claimed is:

1. An image generating apparatus that generates an image by perspective transforming a specific subject existing in a virtual three-dimensional space with a viewing axis of a virtual camera aligned with the specific subject, the image generating apparatus comprising:
   a subject control processor that moves a first position of the specific subject in the virtual three-dimensional space;
   a virtual camera control processor that moves a second position of a viewing point of the virtual camera in the virtual three-dimensional space in accordance with a movement of the first position of the specific subject while aligning the viewing axis of the virtual camera with the specific subject;
   a perspective transformation graphics processor that generates a two-dimensional image displayed on a display by perspective transforming the virtual three-dimensional space including the specific subject on a virtual screen in accordance with the virtual camera that is controlled by the virtual camera control processor;
   an obstacle avoiding area setting processor that sets a camera peripheral area around the viewing point of the virtual camera and a first area that is continuously connected from the camera peripheral area to at least a third position around the specific subject as an obstacle avoiding area, with reference to at least the second position of the viewing point of the virtual camera; and
   an obstacle determining processor that determines whether an obstacle exists in the obstacle avoiding area set by the obstacle avoiding area setting processor,
   wherein the virtual camera control processor includes an obstacle avoiding control processor that moves the second position of the viewing point of the virtual camera to a fourth position for which the obstacle is not located in an updated obstacle avoiding area when it is determined that the obstacle exists in the obstacle avoiding area by the obstacle determining processor,
   wherein the obstacle avoiding area setting processor includes an obstacle avoiding area changer that changes a size of the obstacle avoiding area in accordance with a distance between the second position of the viewing point of the virtual camera in the virtual three-dimensional space and the first position of the specific subject,
   wherein the camera peripheral area is a sphere including the second position of the viewing point of the virtual camera as a center, and
   wherein the obstacle avoiding area setting processor changes a radius of the sphere in accordance with the distance between the second position of the viewing point of the virtual camera in the virtual three-dimensional space and the first position of the specific subject.

2. The image generating apparatus according to claim 1, wherein the obstacle avoiding area setting processor further sets a subject peripheral area around the first position of the specific subject, and sets the obstacle avoiding area as being between the camera peripheral area and the subject peripheral area.

3. The image generating apparatus according to claim 1, wherein the obstacle avoiding area setting processor sets the obstacle avoiding area as being between the camera peripheral area and the first position of the specific subject.

4. The image generating apparatus according to claim 1, wherein the virtual camera control processor moves the second position of the viewing point of the virtual camera to the fourth position while maintaining a height of the second position in a height direction in the virtual three-dimensional space, and
   wherein the obstacle avoiding area setting processor sets the obstacle avoiding area within a plane formed by a straight line that connects the second position of the viewing point of the virtual camera and the first position of the specific subject and other straight lines that are perpendicular to the straight line and parallel to the height direction in the virtual three-dimensional space which is perpendicular to the straight line.

5. The image generating apparatus according to claim 1, wherein the virtual three-dimensional space is a game space of a video game, and
   wherein the obstacle avoiding area changer changes the size of the obstacle avoiding area in accordance with a progress status of the video game.

6. The image generating apparatus according to claim 5, wherein the obstacle avoiding area changer decreases the size of the obstacle avoiding area as a number of objects in a scene which can be the obstacle increases.

7. An image generating method for generating an image with at least one processor by perspective transforming a specific subject existing in a virtual three-dimensional space with a viewing axis of a virtual camera aligned with the specific subject, the image generating method comprising:
   moving, with the at least one processor, a first position of the specific subject in the virtual three-dimensional space, and storing the first position of the specific subject in a storage;
   moving, with the at least one processor, a second position of a viewing point of the virtual camera in the virtual three-dimensional space in accordance with movement of the first position of the specific subject while aligning the viewing axis of the virtual camera with the specific subject, and storing first information on the viewing axis and the second position of the viewing point of the virtual camera in the storage;
   setting, with the at least one processor, a camera peripheral area around the viewing point of the virtual camera and setting a first area that is continuously connected from the camera peripheral area to at least a third position around the specific subject as an obstacle avoiding area, a size of which changes in accordance with a distance between the second position of the viewing point of the virtual camera in the virtual three-dimensional space and the first position of the specific subject, with reference to at least the second position of the viewing point of the virtual camera, and storing second information on the obstacle avoiding area in the storage;
   determining, with the at least one processor, whether an obstacle exists in the obstacle avoiding area based on third information of a fourth position of the obstacle that is stored in the storage;
   moving, with the at least one processor, the second position of the viewing point of the virtual camera to a fifth position for which the obstacle is not located in an updated obstacle avoiding area when it is determined that the obstacle exists in the obstacle avoiding area, and storing fourth information on the viewing axis and the fifth position of the viewing point of the virtual camera in the storage; and
   generating, with the at least one processor, a two-dimensional image to be displayed on a display by perspective transforming the virtual three-dimensional space including the specific subject on a virtual screen based on the fourth information on the viewing axis and the fifth position of the viewing point of the virtual camera that are stored in the storage, and storing the two-dimensional image in the storage, wherein the camera peripheral area is a sphere including the second position of the viewing point of the virtual camera as a center, and wherein the obstacle avoiding area setting processor changes a radius of the sphere in accordance with the distance between the second position of the viewing point of the virtual camera in the virtual three-dimensional space and the first position of the specific subject.

8. A non-transitory computer readable medium including a program that allows a computer apparatus to perform a process for generating an image by perspective transforming a specific subject existing in a virtual three-dimensional space with a viewing axis of a virtual camera aligned with the specific subject, the program allowing the computer apparatus to perform:

moving a first position of the specific subject in the virtual three-dimensional space, and storing the first position of the specific subject in a storage included in the computer apparatus;

moving a second position of the viewing point of the virtual camera in the virtual three-dimensional space in accordance with movement of the first position of the specific subject while aligning the viewing axis of the virtual camera with the specific subject, and storing first information on the viewing axis and the second position of the viewing point of the virtual camera in the storage;

setting a camera peripheral area around the viewing point of the virtual camera and setting a first area that is continuously connected from the camera peripheral area to at least a third position around the specific subject as an obstacle avoiding area, a size of which changes in accordance with a distance between the second position of the viewing point of the virtual camera in the virtual three-dimensional space and the first position of the specific subject, with reference to at least the second position of the viewing point of the virtual camera, and storing second information on the obstacle avoiding area in the storage;

determining whether an obstacle exists in the obstacle avoiding area based on third information of a fourth position of the obstacle that is stored in the storage;

moving the second position of the viewing point of the virtual camera to a fifth position for which the obstacle is not located in an updated obstacle avoiding area when it is determined that the obstacle exists in the obstacle avoiding area, and storing fourth information on the viewing axis and the fifth position of the viewing point of the virtual camera in the storage; and generating a two-dimensional image to be displayed on a display by perspective transforming the virtual three-dimensional space including the specific subject on a virtual screen based on the fourth information on the viewing axis and the fifth position of the viewing point of the virtual camera that are stored in the storage, and storing the two-dimensional image in the storage, wherein the camera peripheral area is a sphere including the second position of the viewing point of the virtual camera as a center, and wherein the obstacle avoiding area setting processor changes a radius of the sphere in accordance with the distance between the second position of the viewing point of the virtual camera in the virtual three-dimensional space and the first position of the specific subject.

9. The image generating apparatus according to claim 1, wherein a cross-sectional area of the obstacle avoiding area, perpendicular to the viewing axis, changes in accordance with the distance between the second position of the viewing point of the virtual camera and the first position of the specific subject for changing the size of the obstacle avoiding area.

10. The image generating apparatus according to claim 2, wherein a radius of the subject peripheral area changes in accordance with the distance between the second position of the viewing point of the virtual camera and the first position of the specific subject for changing the size of the obstacle avoiding area.

11. The image generating method according to claim 7, wherein a cross-sectional area of the obstacle avoiding area, perpendicular to the viewing axis, changes in accordance with the distance between the second position of the viewing point of the virtual camera and the first position of the specific subject for changing the size of the obstacle avoiding area.

12. The image generating method according to claim 7, further comprising:

setting a subject peripheral area around the first position of the specific subject, wherein a second area that is continuously connected between the camera peripheral area and the subject peripheral area is set as the obstacle avoiding area.

13. The image generating method according to claim 12, wherein a radius of the subject peripheral area changes in accordance with the distance between the second position of the viewing point of the virtual camera and the first position of the specific subject for changing the size of the obstacle avoiding area.

14. The non-transitory computer readable medium according to claim 8, wherein a cross-sectional area of the obstacle avoiding area, perpendicular to the viewing axis, changes in accordance with the distance between the second position of the viewing point of the virtual camera and the first position of the specific subject for changing the size of the obstacle avoiding area.

15. The non-transitory computer readable medium according to claim 8, the program allowing the computer apparatus to further perform:

setting a subject peripheral area around the first position of the specific subject, wherein a second area that is continuously connected between the camera peripheral area and the subject peripheral area is set as the obstacle avoiding area.

16. The non-transitory computer readable medium according to claim 15, wherein a radius of the subject peripheral area changes in accordance with the distance between the second position of the viewing point of the virtual camera and the first position of the specific subject for changing the size of the obstacle avoiding area.

* * * * *